United States Patent
Matsumoto et al.

(10) Patent No.: US 6,869,057 B2
(45) Date of Patent: Mar. 22, 2005

(54) SEAT SLIDE DEVICE

(75) Inventors: Tadashi Matsumoto, Shizuoka (JP); Takashi Saitoh, Shizuoka (JP); Akira Osanai, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 10/733,285

(22) Filed: Dec. 12, 2003

(65) Prior Publication Data

US 2004/0124683 A1  Jul. 1, 2004

(30) Foreign Application Priority Data

Dec. 20, 2002 (JP) ........................................ 2002-369252
Sep. 30, 2003 (JP) ........................................ 2003-340292
Sep. 30, 2003 (JP) ........................................ 2003-340293
Oct. 8, 2003 (JP) ........................................ 2003-348925

(51) Int. Cl.[7] .............................................. F16M 13/00
(52) U.S. Cl. ........................................ 248/430; 248/429
(58) Field of Search ................................ 248/424, 429, 248/430

(56) References Cited

U.S. PATENT DOCUMENTS

| | | | | |
|---|---|---|---|---|
| 5,772,173 A | * | 6/1998 | Couasnon | 248/430 |
| 5,785,292 A | * | 7/1998 | Muraishi et al. | 248/429 |
| 6,328,272 B1 | * | 12/2001 | Hayakawa et al. | 248/429 |
| 2002/0060281 A1 | | 5/2002 | Okazaki et al. | |
| 2003/0230696 A1 | * | 12/2003 | Yamada et al. | 248/424 |
| 2004/0118990 A1 | * | 6/2004 | Yokoi et al. | 248/424 |

FOREIGN PATENT DOCUMENTS

| | | | | |
|---|---|---|---|---|
| DE | 3227909 A1 | * | 3/1983 | ........... 248/429 |
| JP | 62-91335 A | * | 4/1987 | ........... 248/430 |
| JP | 10-309965 A | | 11/1998 | |
| JP | 2000-168409 A | | 6/2000 | |
| JP | 2002-154356 A | | 5/2002 | |
| JP | 2002-192994 A | | 7/2002 | |
| JP | 2002-200934 A | | 7/2002 | |

* cited by examiner

*Primary Examiner*—Anita King
*Assistant Examiner*—Jon Szumny
(74) *Attorney, Agent, or Firm*—Foley & Lardner LLP

(57) ABSTRACT

An upper rail is slidably engaged with a lower rail in a manner to define an elongate enclosed space therebetween. A lock plate is placed in the elongate enclosed space and secured to the lower rail. A latch lever includes a pawl portion and an input arm and is placed in the elongate enclosed space. The latch lever is pivotally connected to the upper rail to pivot between a lock position where the pawl portion is engaged with a part of the lock plate to establish a locked engagement between the lower and upper rails and an unlock position where the pawl portion is released from the lock plate to cancel the locked engagement. The latch lever is pivoted in a direction from the lock position to the unlock position when the input arm is applied with an external force. A spring member is placed in the elongate enclosed space to bias the latch lever to pivot toward the lock position, An opening is formed in the upper rail for having a given part of the input arm projected outward therethrough.

26 Claims, 27 Drawing Sheets

(UPSIDE DOWN)

(UPSIDE DOWN)

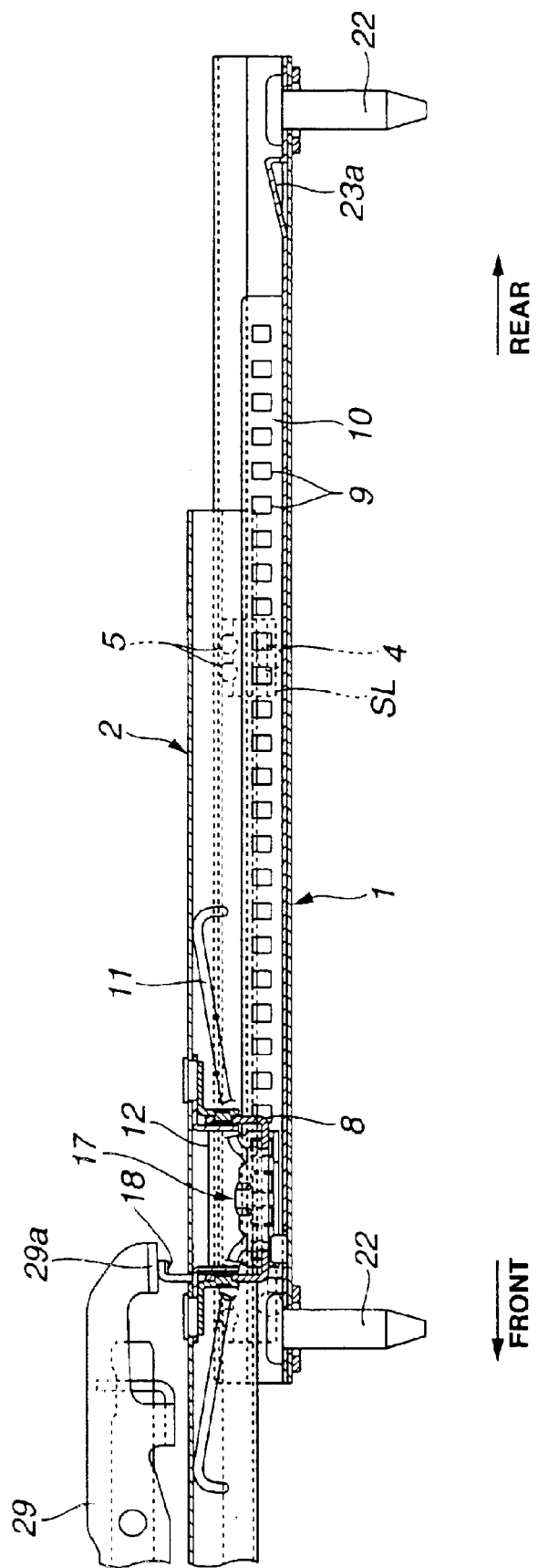

SEAT SLIDE DEVICE

BACKGROUND OF THE INVENTION

1. Field of the Invention

The present invention relates in general to seat slide devices for motor vehicles and more particularly to the seat slide devices of a type that has an improved lock mechanism is compact in construction.

2. Description of the Related Art

Hitherto, various seat slide devices have been proposed and put into practical use particularly in the field of wheeled motor vehicles. Some of them are of a type that has a lock mechanism that is compactly installed between a lower rail that is secured to a vehicle floor and an upper rail that slides on and along the lower rail and mounts thereon a seat. Seat slide devices of such type are shown in Japanese Laid-open Patent Application (Tokkaihei) 10-309965 and Japanese Laid-open Patent Application 2002-154356. However, due to their inherent construction, the seat slide devices of the publications fail to provide the makers and users with a satisfaction. That is, some of them show a poor locking performance of the lock mechanism and some of them need a troublesome and thus time-consumed assembling work for assembling the seat slide device. Furthermore, some of them fail to provide a satisfied compact construction, and some of them are highly costly.

SUMMARY OF THE INVENTION

It is therefore an object of the present invention to provide a seat slide device which is free of the above-mentioned drawbacks.

According to a first aspect of the present invention, there is provided a seat slide device which comprises a lower rail having a channel structure; an upper rail having a channel structure, the upper rail being slidably engaged with the lower rail in a manner to define an elongate enclosed space therebetween; a lock plate placed in the elongate enclosed space and secured to the lower rail; a latch lever including a pawl portion and an input arm and placed in the elongate enclosed space, the latch lever being pivotally connected to the upper rail to pivot about a given axis that extends in parallel with the upper rail, the latch lever being pivotal between a lock position where the pawl portion is engaged with a part of the lock plate to establish a locked engagement between the lower and upper rails and an unlock position where the pawl portion is released from the lock plate to cancel the locked engagement, the latch lever being pivoted in a direction from the lock position to the unlock position when the input arm is applied with an external force; a spring member placed in the elongate enclosed space for biasing the latch lever to pivot toward the lock position; and an opening formed in the upper rail for having a given part of the input arm projected outward therethrough.

According to a second aspect of the present invention, there is provided a seat slide device which comprises a lower rail having a generally U-shaped cross section; an upper rail having a generally reversed U-shaped cross section, the upper rail being slidably engaged with the lower rail in a manner to define therebetween an elongate enclosed space; an elongate lock plate placed in the elongate enclosed space and secured to the lower rail, the lock plate being formed with a plurality of aligned lock openings; a latch lever including pawls and an input arm and placed in the elongate enclosed space, the latch lever being pivotally connected to the upper rail to pivot between a lock position where the pawls are inserted into some of the lock openings to establish a locked engagement between the lower and upper rails and an unlock position where the pawls are released from the lock openings to cancel the locked engagement, the latch lever being pivoted in a direction from the lock position to the unlock position when the input arm is pressed in a given direction; a supporting bracket placed in the elongate enclosed space and secured to the upper rail, the supporting bracket being formed with holding openings through which the pawls the latch lever are engaged with the lock openings of the lock plate for establishing the lock position of the latch lever; holding openings formed in the upper rail with which leading ends of the pawls of the latch lever are engaged when the latch lever assumes the lock position; a curved bar spring having opposed ends pressed against an inside wall of the upper rail and a swelled center portion pressed against the latch lever thereby to bias the latch lever to pivot toward the lock position; an opening formed in the upper rail from which a given part of the input arm is projected outward; and a lock canceling device mounted on the upper rail, the device pressing the given part of the input arm in the given direction when actuated.

BRIEF DESCRIPTION OF THE DRAWINGS

Other objects and advantages of the present invention will become apparent from the following description when taken in conjunction with the accompanying drawings, in which:

FIG. 32 is a view similar to FIG. 6, but showing the third embodiment of the present invention.

DETAILED DESCRIPTION OF THE EMBODIMENTS

In the following, embodiments 100A, 100B and 100C of the present invention will be described in detail with reference to the accompanying drawings.

For ease of understanding, various directional terms, such as, right, left, upper, lower, rightward, etc., are used in the following description. However, such terms are to be understood with respect to a drawing or drawings on which the corresponding part or portion is shown.

Referring to FIGS. 1 to 7, particularly FIGS. 1 to 4, there is shown a seat slide device 100A which is a first embodiment of the present invention.

Figure 1:
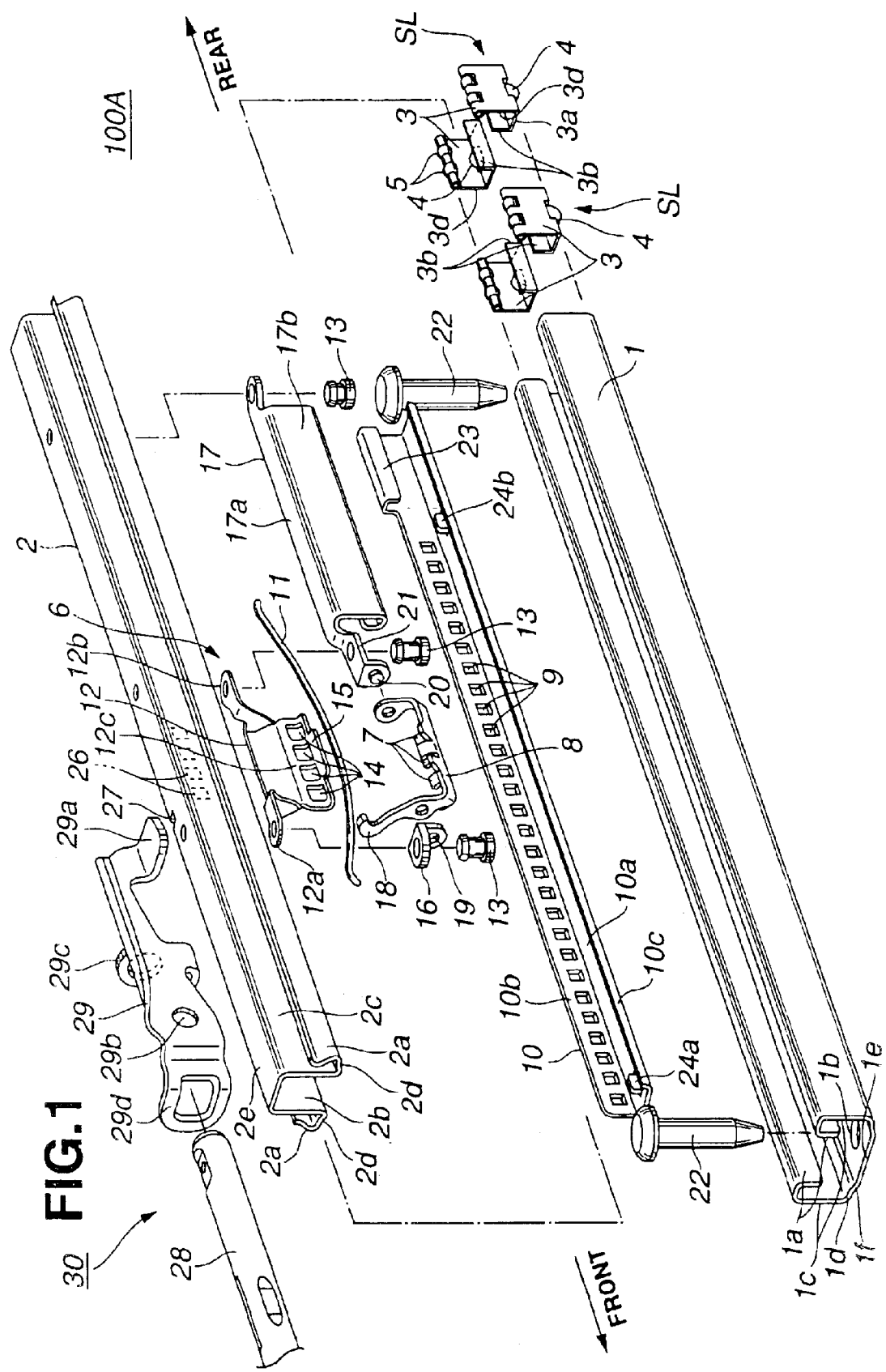
FIG. 1 is an exploded view of a seat slide device which is a first embodiment of the present invention.
Figure 2:
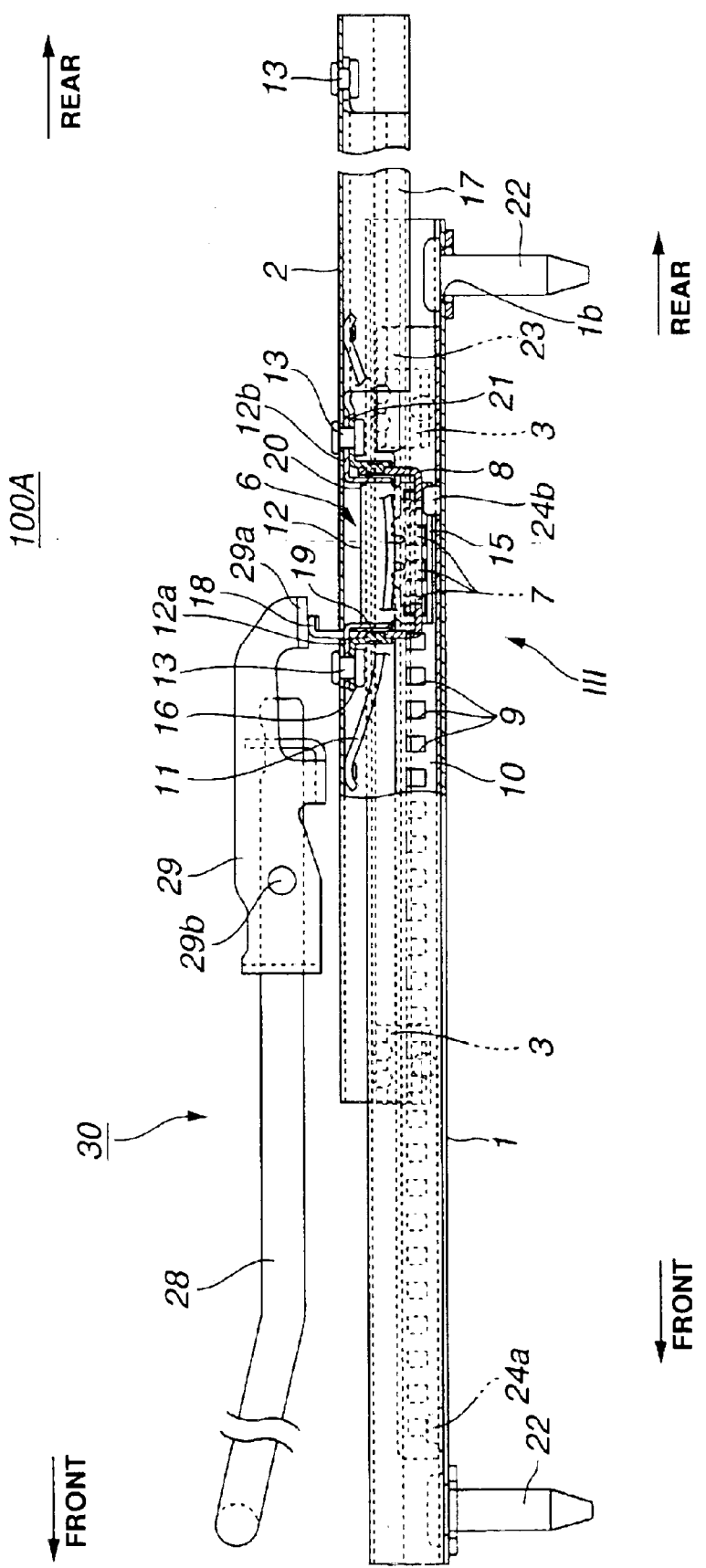
FIG. 2 is a vertically sectioned view of the seat slide device of the first embodiment in an assembled condition, showing a state wherein a seat (not shown) takes its rearmost position.

As is understood from FIGS. 1 and 2, the seat slide device 100A comprises a lower rail 1 that has a generally U-shaped cross section and is secured to a vehicle floor (not shown) by bolts 22 and an upper rail 2 that has a generally reversed U-shaped cross section and slides on and along the lower rail 1. Although not shown in the drawings, a seat (more particularly, a seat portion of the seat) is mounted on the upper rail 2, so that the seat can slide on and along the lower rail 1 together with the upper rail 2.

As will become apparent as the description proceeds, another seat slide device that is substantially the same in construction as the device 100A is arranged beside the device 100A for carrying or supporting the seat together with the device 100A.

For smoothing the movement of the upper rail 2 relative to the lower rail 1, two pairs of sliders SL are received in the lower rail 1, each slider SL including two mutually facing retainer plates 3, two rollers 4 rotatably and respectively held by the retainer plates 3 and two pairs of guide balls 5 rotatably and respectively held by the retainer plates 3.

As is seen from FIG. 1, each retainer plate 3 comprises a base lower wall 3a by which the roller 4 is rotatably held, a higher vertical side wall 3d by which the guide balls 5 are rotatably held and a lower vertical side wall 3b.

The lower rail 1 has a generally U-shaped cross section, which comprises a lower base portion 1e, two side wall portions 1c respectively raised from side edges of the base portion 1e and two inwardly curled upper portions 1a respectively formed on upper edges of the side wall portions 1c. For the purpose which will be clarified hereinafter, between the lower base portion 1e and each of the side wall portions 1c, there is formed a step 1d that is raised a little at a portion 1f from the lower base portion 1e.

The upper rail 2 has also a generally U-shaped cross section, which comprises an upper base portion 2e, two side wall portions 2b and 2c respectively extending downward from side edges of the base portion 2e and two outwardly curled lower portions 2d respectively formed on lower edges of the side wall portions 2c. Each outwardly curled lower portion 2d has a lateral end portion 2a.

Figure 4:
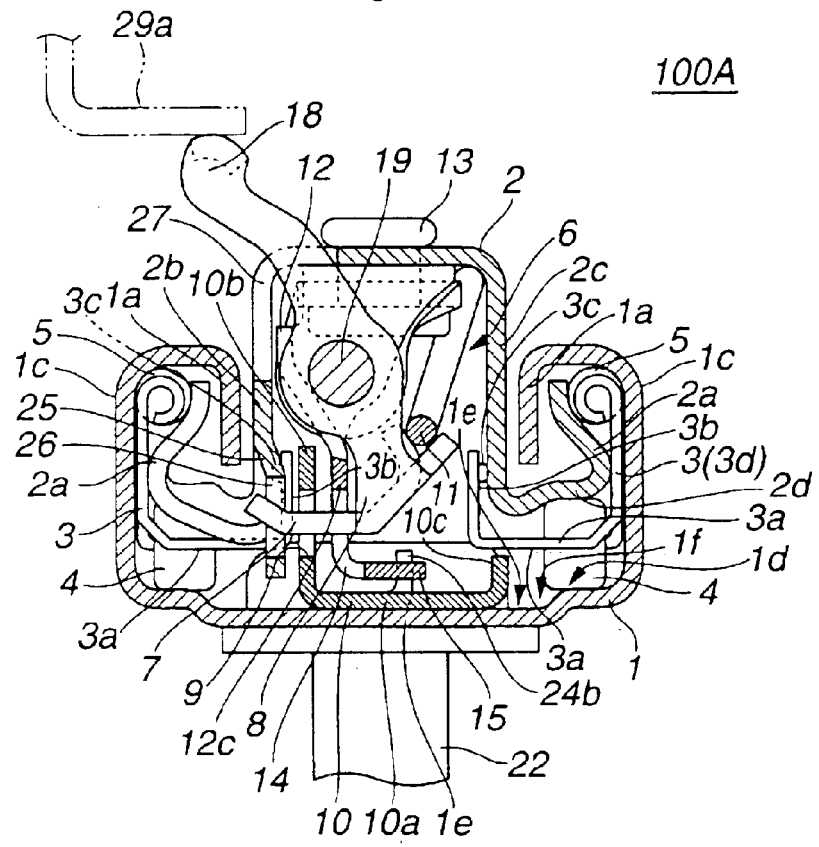
FIG. 4 is a sectional view taken along the line "IV—IV" of FIG. 3, showing a condition wherein a lock mechanism takes a lock position.

As is seen from FIG. 4, upon assembly of the lower and upper rails 1 and 2, the outer end portion 2a of the upper rail 2 is received in the corresponding inwardly curled upper portion 1a of the lower rail 1. Each retainer plate 3 is freely received between the lower and upper rails 1 and 2, and each roller 4 held by the retainer plate 3 is put on the corresponding step 1d of the lower rail 1 to support the corresponding outwardly curled lower portion 2d of the upper rail 2. The paired guide balls 5 held by the retainer plate 3 are put between the corresponding side wall 1c of the lower rail 1 and the corresponding lateral end portion 2a of the upper rail 2, as shown. Thus, under movement of the upper rail 2 on and along the lower rail 1, the rollers 4 run on the steps 1d of the lower rail 1 supporting the outwardly curled lower portions 2d of the upper rail 2, and at the same time, the guide balls 5 guide the movement of the upper rail 2 relative to the lower rail 1.

Referring back to FIG. 1, a lock mechanism 6 is arranged between the lower and lower rails 1 and 2 to selectively make a locking of the upper rail 2 relative to the lower rail 1.

The lock mechanism 6 generally comprises an elongate lock plate 10 that is secured via welding or the like to the lower rail 1 and has a plurality of aligned lock openings 9, a supporting bracket 12 that is secured to the upper rail 2 and has four aligned holding openings 14, a latch lever 8 that is pivotally held by the upper rail 2 and has four pawls 7, and a bar spring 11 that biases the latch lever 8 in a direction to establish engagement of the pawls 7 of the latch lever 8 with the lock openings 9 of the lock plate 10.

As will be described in detail hereinafter, the latch lever 8 is pivotal about a given axis that extends in parallel with the upper rail 2.

As is seen from FIG. 1, the supporting bracket 12 comprises a pair of connecting lugs 12a and 12b that are connected to an inner surface of the upper base portion 2e of the upper rail 2 by means of rivets 13, a vertical wall portion 12c that extends between the connecting lugs 12a and has the four holding openings 14 formed therein, and a horizontal lower edge portion 15 that extends at right angles from a lower edge of the vertical wall portion 12c.

Figure 14:
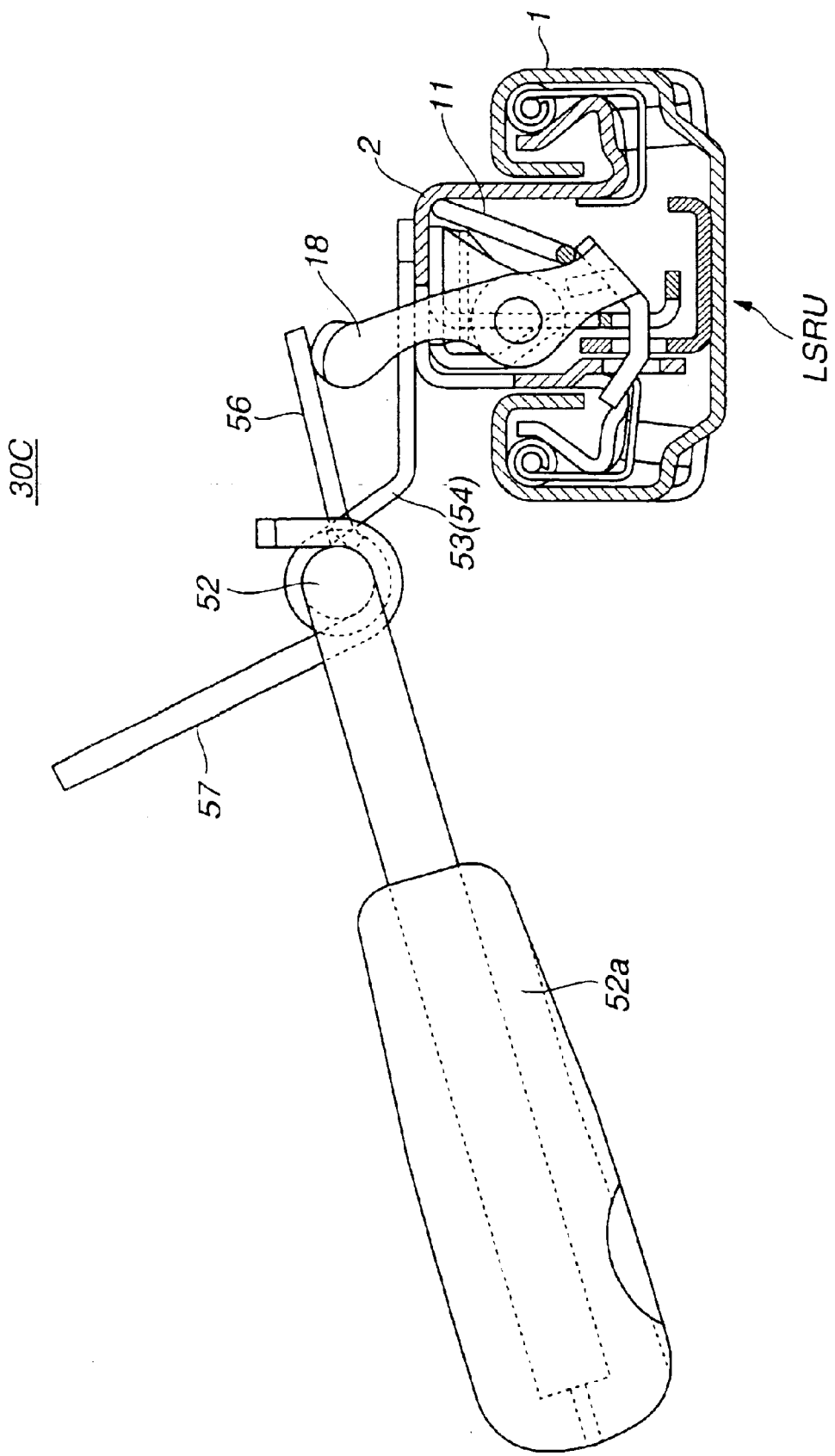
FIG. 14 is an enlarged view of a portion of the third modification of the lock canceling mechanism, which is indicated by the arrow "XIV" in FIG. 12.
Figure 17:
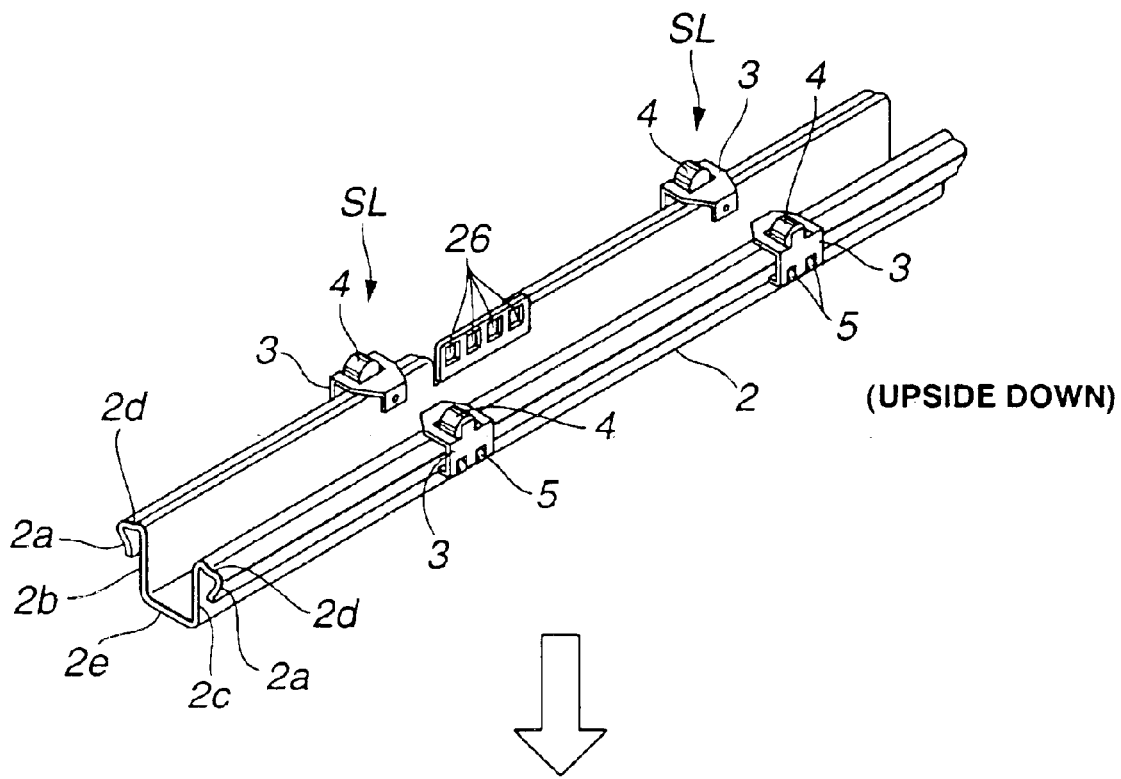
FIGS. 17 and 18 are views showing steps for assembling a slide rail unit.

As will be seen from FIG. 14, in a full lock condition of the lock mechanism 6, the pawls 7 of the latch lever 8 pass through the holding openings 14 of the supporting bracket 12, the lock openings 9 of the lock plate 10 and four holding openings 26 that are formed in the side wall portion 2b of the upper rail 2. As is shown in FIG. 17 and will be described hereinafter, the four holding openings 26 may be formed in a separate plate that is secured to the side wall portion 2b of the upper rail 2.

Referring back to FIG. 1, the latch lever 8 has a generally U-shaped structure and comprises a bridge portion on which the pawls 7 are integrally formed and two side arms which extend from opposed ends of the bridge portion in the same direction. The side arms are pivotally connected a bracket 16 and a stopper structure 17 respectively. The bracket 16 is secured to the upper rail 2 by the rivet 13, and the stopper structure 17 is secured to the upper rail 2 by two rivets 13. More specifically, a pin portion 19 possessed by the bracket 16 is put in an opening formed in one of the side arms of the latch lever 8, and a pin portion 20 possessed by the stopper structure 17 is put in an opening formed in the other of the side arms of the stopper structure 17. It is to be noted that the above-mentioned given axis about which the latch lever 8 pivots is a common axis possessed by the two pin portions 19 and 20, and the pin portions 19 and 20 are produced via embossing work.

As is understood from FIGS. 1 and 4, the stopper structure 17 comprises an upper wall portion 17a that abuts against an inner surface of the upper base portion 2e of the upper rail 2, a curled side wall portion 17b that extends downward from one edge of the upper wall portion 17a, and a bracket portion 21 that extends from the upper wall portion 17a and has the pin portion 20 fixed thereto. The bracket portion 21 has an opening through which the rivet 13 passes for securing the bracket portion 21 to the upper rail 2. Another bracket portion (no numeral) extends from the other end of the upper wall portion 17a, which has an opening through which the other rivet 13 for securing the bracket portion to the upper rail 2.

As is seen from FIG. 1, one of the side arms of the latch lever 8 is made longer than the other and has a rounded head 18. As will become apparent as the description proceeds, the longer side arm with the head 18 serves as an input arm (18). That is, once the head 18 is pushed down by an external force, the lock condition of the lock mechanism 6 is cancelled.

Figure 3:
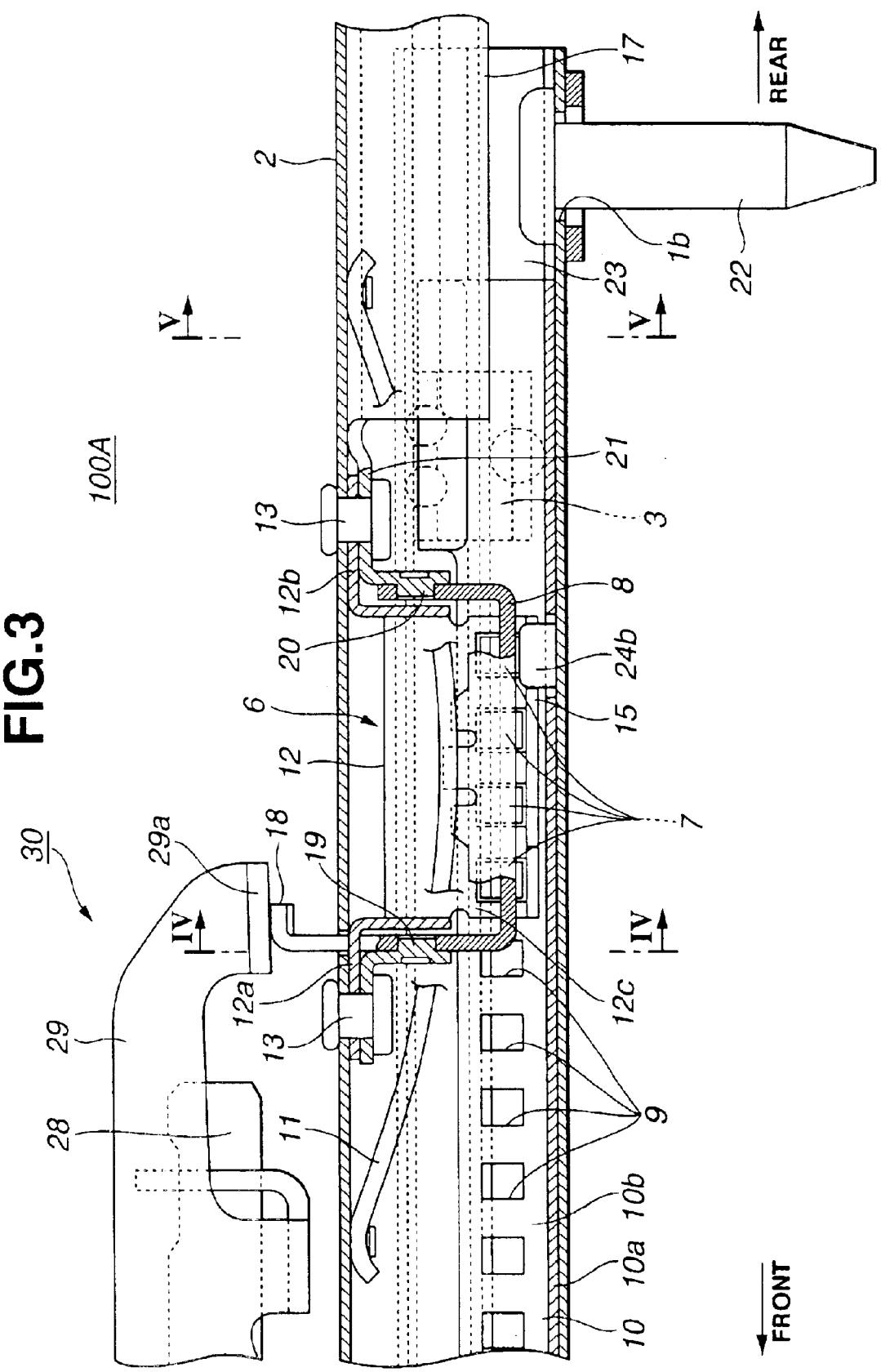
FIG. 3 is an enlarged view of an essential portion of the seat slide device of the first embodiment, which is indicated by the arrow "III" shown in FIG. 2.

The bar spring 11 is slightly curved and has opposed ends that are fitted to the inner wall of the upper base portion 2e of the upper rail 2, as is seen from FIG. 3. That is, each end of the bar spring 11 is held by a projection (no numeral) provided by the side wall portion 2b of the upper rail 2.

As is seen from FIG. 3, upon assembly, the curved center portion of the bar spring 11 is engaged with the toothed portion 7 of the bridge portion of the latch lever 8 to bias the latch lever 8 in the direction to establish the engagement of the pawls 7 with the lock openings 9 of the lock plate 10.

Figure 5:
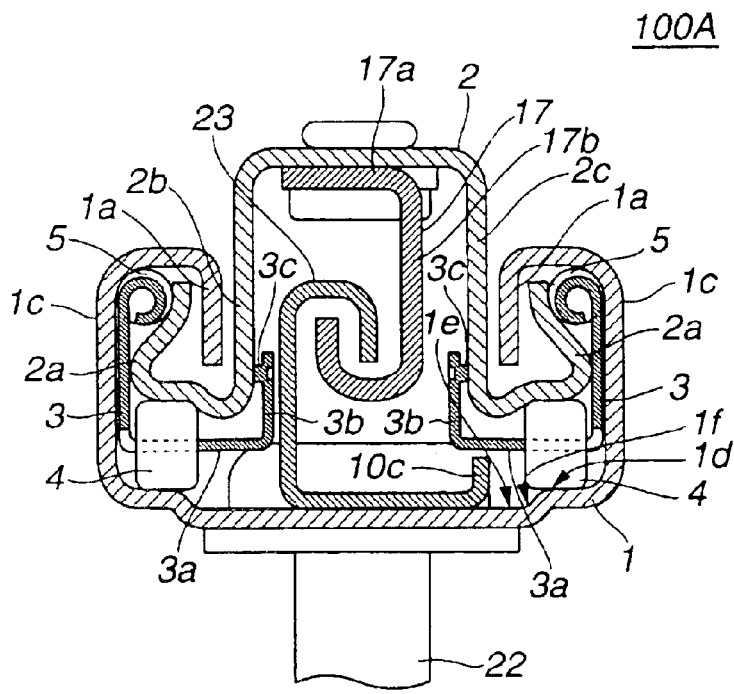
FIG. 5 is a sectional view taken along the line "V—V" of FIG. 3.
Figure 6:
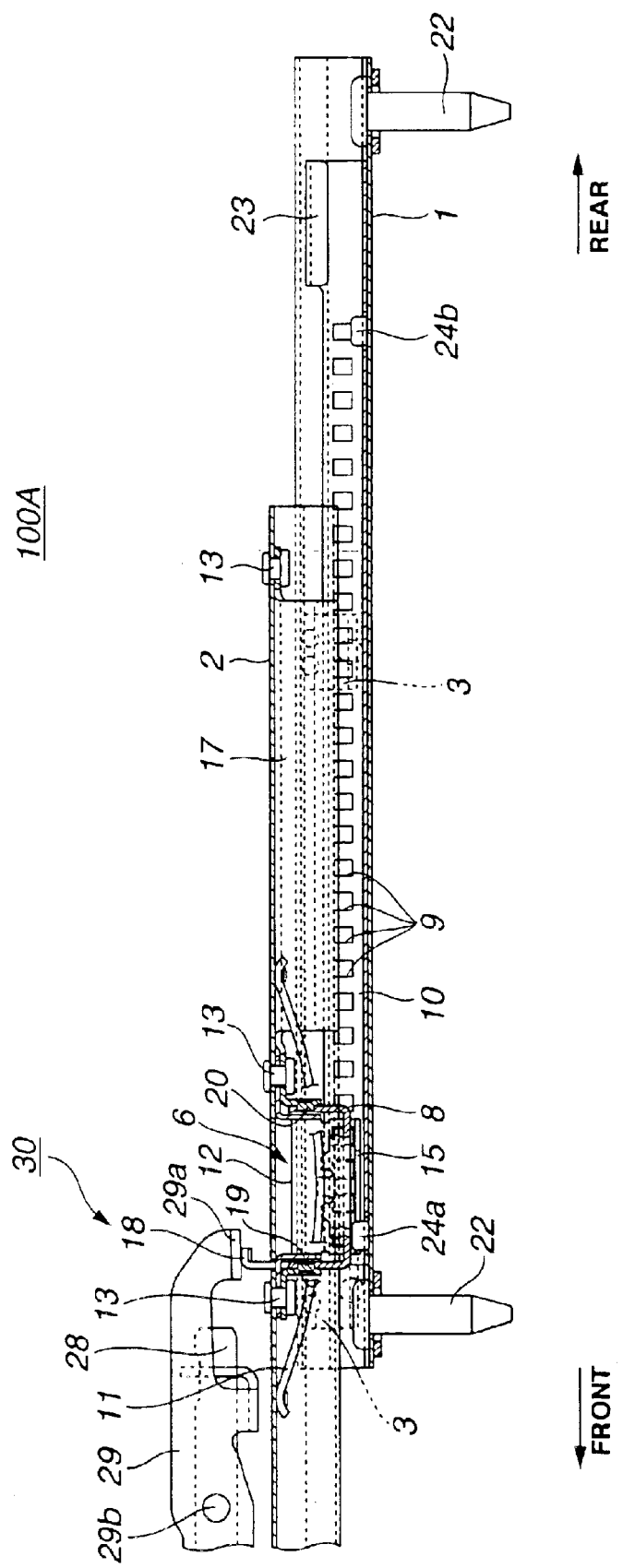
FIG. 6 is a view similar to FIG. 2, but showing a state wherein the seat takes its frontmost position.

As is seen from FIGS. 1 and 5, the stopper structure 17 is fixed to a rear portion of the upper rail 2. As will be understood from the following, upon assembly, the curled side wall portion 17b of the stopper structure 17 is slidably engaged with a catch portion 23 of the lock plate 10.

As will be described in detail hereinafter, with this engagement between the curled side wall portion 17b of the stopper structure 17 and the catch portion 23 of the lock plate 10, undesired lifting phenomenon of the upper rail 2 from the lower rail 1, which would occur when the seat assumes a rear position, is suppressed or at least minimized. Such engagement exhibits a powerful performance in case of a head-on collision of the associated motor vehicle. In fact, upon such collision, a remarked force is applied to the upper rail 2 in a direction to disengage the upper rail 2 from the lower rail 1. However, with the engagement, such disengagement movement of the upper rail 2 is suppressed or at least minimized.

As is seen from FIGS. 1 and 4, the lock plate 10 has a generally L-shaped cross section. The lock plate 10 comprises a lower base portion 10a that is secured via welding or the like to an inner surface of the lower base portion 1e of the lower rail 1 and a vertical wall portion 10b that is raised perpendicular from a side edge of the lower base portion 10a and has the aligned lock openings 9 formed therein. As is seen from FIG. 4, upon assembly, the vertical wall portion 10b is placed between the vertical wall portion 12c of the supporting bracket 12 and the side wall portion 2b of the upper rail 2.

As has been mentioned hereinabove, when, as is seen from FIG. 4, the lock mechanism 6 assumes its lock position, the pawls 7 of the latch lever 8 are received in the holding openings 14 of the supporting bracket 12, the lock openings 9 of the lock plate 10 and the holding openings 26 of the side wall portion 2b of the upper rail 2.

As is seen from this drawing, the holding openings 26 of the side wall portion 2b are formed in an inwardly depressed portion 25 of the side wall portion 2b.

It is to be noted that the four holding openings 26 of the side wall portion 2b and the four holding openings 14 of the supporting bracket 12 are aligned respectively.

It is to be noted that the pitch of the lock openings 9 of the lock plate 10 is the same as that of the holding openings 26 and 14.

Referring back to FIG. 1, the vertical wall portion 10b of the lock plate 10 is formed at its rear portion with the above-mentioned catch portion 23 that has an inverted U-shaped cross section. As has been mentioned hereinabove, the catch portion 23 is engageable with the stopper structure 17 of the upper rail 2 to suppress undesired lifting movement of the upper rail 2 from the lower rail 1. This lift suppressing function will be easily understood when having a look at FIG. 5.

As is seen from FIG. 2, when the upper rail 2 (and thus the seat) takes a rear position relative to the lower rail 1, the stopper structure 17 is actually engaged with the catch portion 23. At this position, the undesired lifting movement of the upper rail 2 is suppressed. While, as is seen from FIG. 6, when the upper rail 2 (and thus the seat) takes a front position, the stopper structure 17 is kept away from the catch portion 23. At this position, the lifting preventing function is not expected.

Referring back to FIG. 1, the lower base portion 10a of the lock plate 10 is integrally formed at front and rear portions thereof with front and rear stoppers 24a and 24b against which the horizontal lower edge portion 15 of the supporting bracket 12 abuts to restrict the axially sliding movement of the upper rail 2 relative to the lower rail 1. That is, when, as is seen from FIG. 6, the lower edge portion 15 abuts against the front stopper 24a, the seat takes its frontmost position, while, when, as is seen from FIG. 2, the lower edge portion 15 abuts against the rear stopper 24b, the seat takes its rearmost position.

As is seen from FIGS. 1 and 4, the upper rail 2 is formed at its middle portion with an opening 27 through which the input arm (18) of the latch lever 8 is projected upward.

As is seen from FIG. 1, engaged with the projected input arm 18 is a lock canceling mechanism 30 which functions to push down the input arm 18 when a U-shaped handle 28 located below the seat is pulled upward.

It is to be noted that the U-shaped handle 28 is constructed to actuate the input arm 18 as well as an input arm (not shown) which is a part of a lock mechanism of another seat slide device which is arranged beside the device 100A.

As is seen from FIGS. 1 and 2, the lock canceling mechanism 30 comprises a pivot lever 29 that is pivotally connected to the upper rail 2 through a stand member (not shown) secured to the upper rail 2. For this pivoting, a pivot pin (not shown) possessed by the stand member passes through an opening 29b of the pivot lever 29. The pivot lever 29 has at a rear end a pushing lug 29a that is positioned above the projected head 18 of the input arm. The pivot lever 29 is formed with two aligned openings 29c and 29d into which a rear end of one side portion of the U-shaped handle 28 is tightly inserted. Thus, when, as is seen from FIG. 3, the handle 28 is pulled upward, the pushing lug 29a of the pivot lever 29 pushes down the projected head 18 of the input arm, which brings about an unlock condition (see FIG. 7) of the lock mechanism 6, as will be described in detail hereinafter.

Although not shown in the drawings, a biasing spring is employed for biasing the U-shaped handle 28 in a direction to separate the pushing lug 29a of the pivot lever 29 from the projected head 18 of the input arm of the latch lever 8.

Thus, when the U-shaped handle 28 is released from an operator's hand, the pushing lug 29a is kept separated from the projected head 18 of the input arm due to the force of the biasing spring, and thus, under this condition, the lock mechanism 6 is forced to take the lock position due to the biasing force of the bar spring 11, as shown in FIG. 4.

Figure 7:
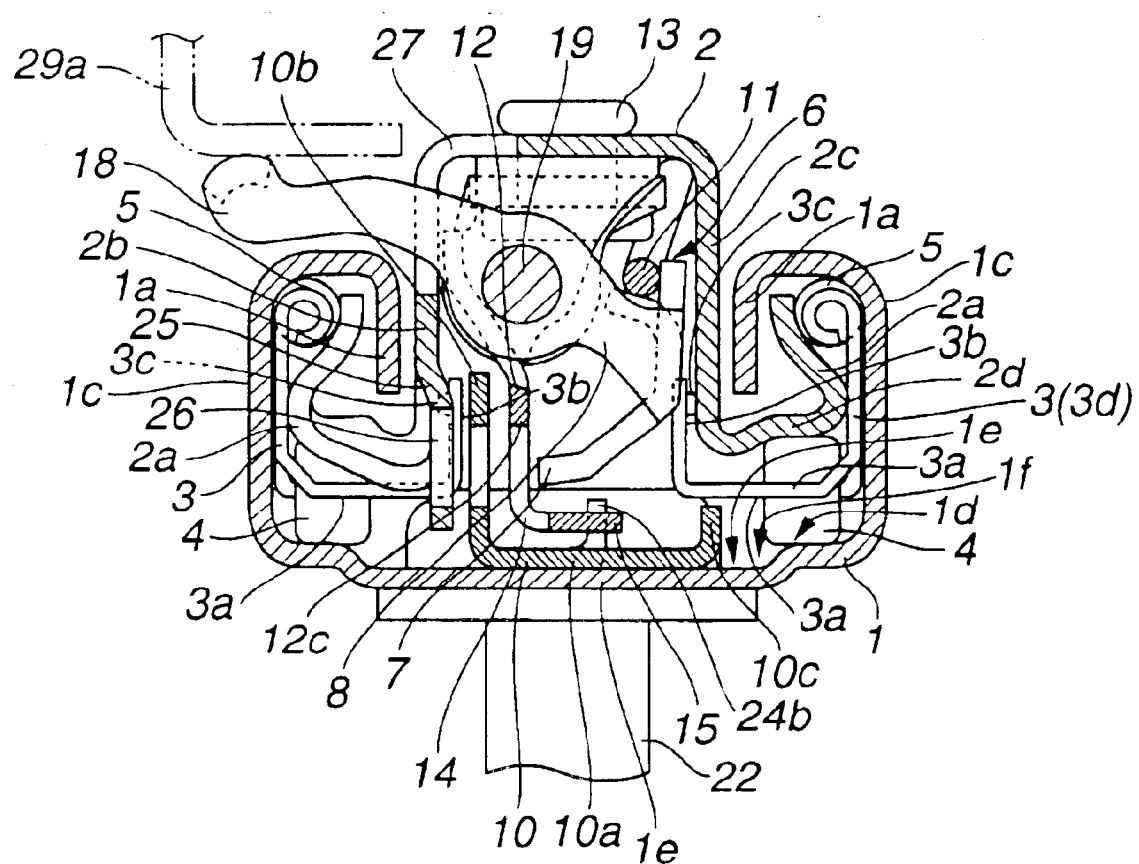
FIG. 7 is a view similar to FIG. 4, but showing a state wherein the lock mechanism assumes an unlock position.

When now the handle 28 is pulled upward against the force of the biasing spring, the pushing lug 29a of the pivot lever 29 pushes down the head of the input arm 18, and thus the lock mechanism 6 is forced to take the unlock position against the biasing force of the bar spring 11, as shown in FIG. 7. Under this condition, the upper rail 2 is permitted to slide freely on and along the lower rail 1 for changing the fore-and-aft position of the seat.

Upon manipulation of the U-shaped handle 28, the other lock mechanism (not shown) installed in the other slide device (not shown) is operated in substantially same manner as that mentioned hereinabove.

In the following, operation will be described in detail with reference to the drawings.

For ease of explanation, the description will be commenced with respect to a normal or lock condition wherein as is shown in FIG. 4, the lock mechanism 6 assumes the lock condition. That is, under this condition, as has been mentioned hereinabove, due to the biasing force of the bar spring 11, the pawls 7 of the latch lever 8 are received in the holding openings 14 of the supporting bracket 12, the lock openings 9 of the lock plate 10 and the holding openings 26 of the side wall 2b of the upper rail 2. Thus, the upper rail 2 and thus the seat mounted thereon is kept locked at a position relative to the lower rail 1.

When, now, for the purpose of changing the position of the seat, the U-shaped handle 28 is pulled upward by an operator, the head of the input arm 18 of the latch lever 8 is pushed downward by the pushing lug 29a of the pivot lever 29. Thus, the lock mechanism 6 is forced to take the unlock position, as shown in FIG. 7.

Thus, when, with the handle 28 kept pulled upward, the seat is pushed forward or backward, the same will slide to a desired position relative to the lower rail 1 (more specifically lower rails 1). When the seat comes to the desired position, the handle 28 is released from the operator's hand. Upon this, due to the biasing force of the biasing spring (not shown) for the handle 28, the handle is forced to pivot downward separating the pushing lug 29a from the head of the input arm 18 of the latch lever 8. Upon this, due to the biasing force of the bar spring 11, the pawls 7 of the latch lever 8 are inserted into the holding openings 14, the lock openings 9 and the holding openings 26 thereby to establish the lock condition of the lock mechanism 6 as shown in FIG. 4. If, due to lack of coincidence between the holding openings 14 (and 26) and the lock openings 9, the pawls 7 abut against land areas of the vertical wall portion 10b of the lock plate 10 and thus fail to be inserted into the lock openings 9 of the lock plate 10, the seat should be moved slightly forward or rearward. Upon this, the coincidence becomes achieved thereby to bring about the lock condition of the lock mechanism 6.

Figure 16:
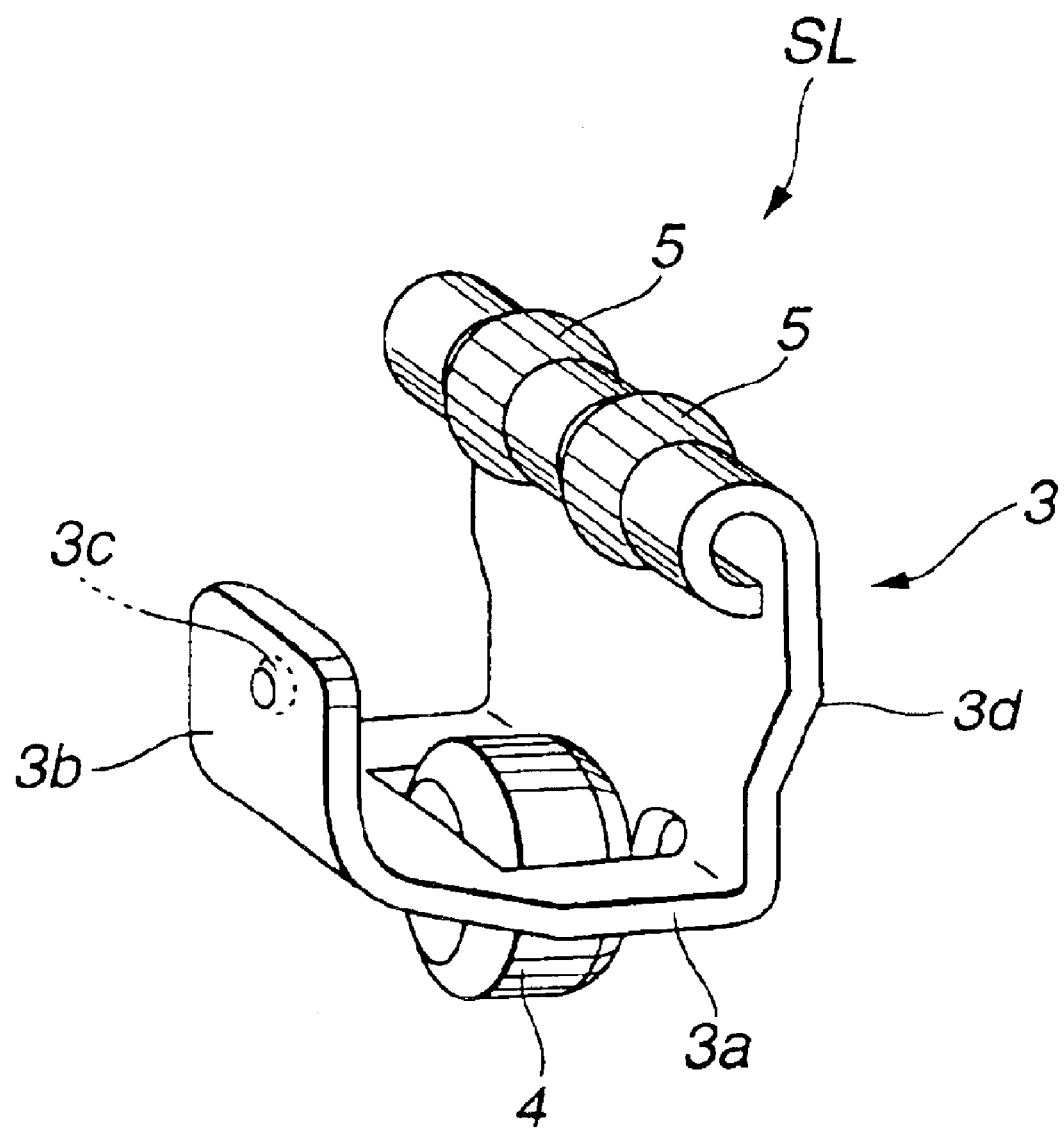
FIG. 16 is an enlarged perspective view of a slider employed in the first embodiment.

Referring to FIG. 16, there is shown the detail of the slider SL. As shown, the slider SL comprises the retainer plate 3 that has a generally L-shaped cross section including the base lower wall 3a that has a rectangular opening for rotatably receiving the roller 4, the higher vertical side wall 3d that has a curled upper end by which the two guide balls 5 are rotatably held, and the lower vertical side wall 3b. As shown, the lower vertical side wall 3b is formed at its inside surface with a projection 3c. As is seen from FIG. 5, upon assembly, the projection 3c contacts an inner surface of the side wall portion 2b or 2c of the upper rail 2, for smoothing movement of the slider SL relative to both the lower and upper rails 1 and 2.

Figure 18:
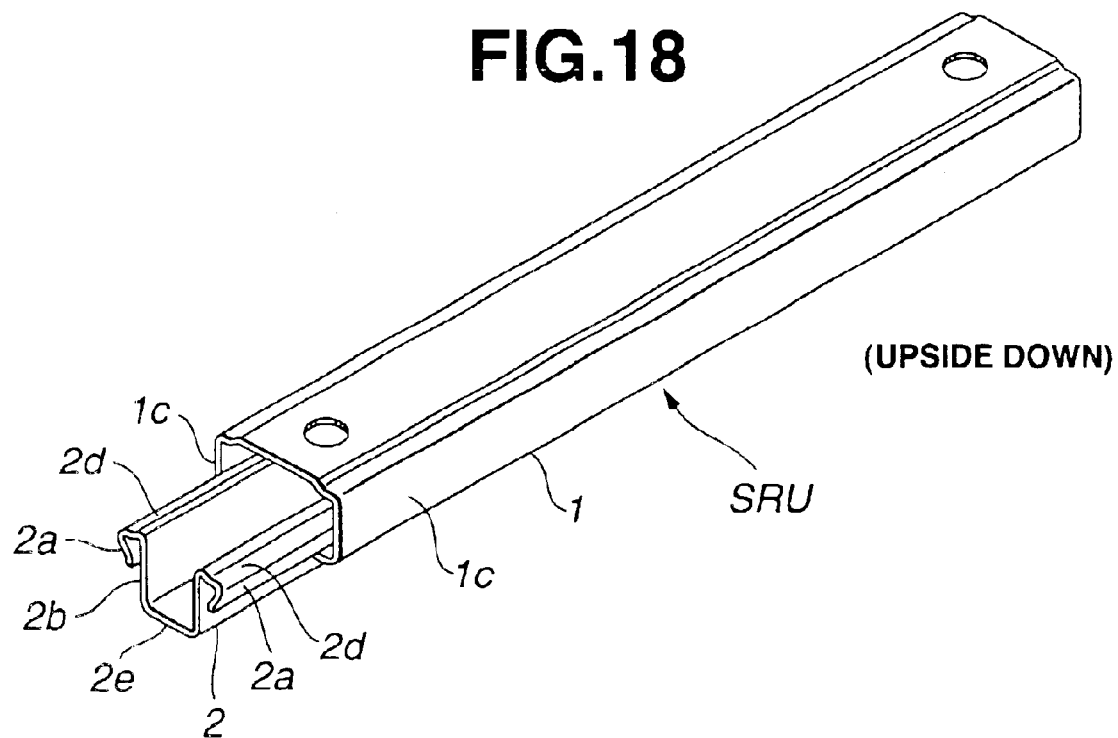

In the following, steps for assembling the slide rail unit SRU will be briefly described with the aid of FIGS. 17 and 18. It is to be noted the FIGS. 17 and 18 are drawings that show the lower rail 1, the upper rail 2 and the sliders SL in an upside-down manner.

As is seen from FIG. 17, the upper rail 2 having the parts of the lock mechanism 6 already fitted thereto is put upside down. Then, the four sliders SL are put on the outwardly curled lower portions 2d. That is, each slider SL is put on the curled lower portion 2d in such a manner that the higher and lower vertical side walls 3d and 3b of the retainer plate 3 put therebetween the side wall portion 2b or 2c having the roller 4 put on the curled lower portion 2d. It is to be noted that one pair of the sliders SL are arranged at a right position of the upper rail 2 with respect to the parts of the lock mechanism 6 and the other pair of the sliders SL are arranged at a left position with respect to the parts of the lock mechanism 6. Then, as is seen from FIG. 18, the lower rail 1 is slid on the upper rail 2 from one end of the upper rail 2 having the side wall portions 1c thereof slidably engaged with the lateral end portions 2a of the upper rail 2 (see FIG. 5). Of course, the slide rail unit SRU thus assembled is turned upside down before being served.

In the following, advantages of the seat slide device 100A of the first embodiment will be described.

First, as is seen from FIG. 4, the latch lever 8 is pivotal about a common axis of the pin portions 19 and 20 which is extends along and in parallel with the upper rail 2. Accordingly, the latch lever 8 is permitted to have an increased pivot angle range relative to the lock plate 10. This brings about establishment of an assured engagement of the pawls 7 of the latch lever 8 with the lock openings 9 of the lock plate 10 thereby assuring the locked condition of the upper rail 2 (or seat) relative to the lower rail 1 (or vehicle floor).

Second, as is understood from FIG. 1, the opening 27 through which the head of the input arm 18 of the latch lever 8 is projectable is provided at an axially intermediate portion of the upper rail 2. This means an easiness with which the layout of the lock canceling mechanism 30 is readily carried out. That is, the upper base portion 2e of the upper rail 2 can provide the pivot lever 29 with a larger mounting space at both front and rear portions.

Third, as is seen from FIG. 4, substantially all parts of the lock mechanism 6 are compactly installed in an enclosed space defined between the lower and upper rails 1 and 2. Thus, seat slide device 100A can have a neat appearance. Furthermore, by the same reason, a space defined between the two seat slide devices 100A under the seat can be widely and effectively used as a container space.

Fourth, the lock plate 10 is a separate member that is secured to the lower rail 1 via welding or the like. Thus, the position change range of the upper rail 2 relative to the lower rail 1 can be easily changed by changing the length of the lock plate 10. Furthermore, since the lower rail 1 has no need of having lock openings, the mechanical strength of the same is not affected, but increased due to the secured connection of the lock plate 10 thereto.

Fifth, the stoppers 24a and 24b by which the moved distance of the upper rail 2 relative to the lower rail 1 is restricted are integral parts of the lock plate 10. Furthermore, the lower edge portion 15 that abuts against the stoppers 24a and 24b is an integral part of the supporting bracket 12 secured to the upper rail 2. Such construction and arrangement bring about reduction in parts used for assembling the seat slide device 100A.

Sixth, because of engagement between the stopper structure 17 secured to the upper rail 2 and the catch portion 23 possessed by the lock plate 10, undesired lifting phenomenon of the upper rail 2, which tends to occur when the seat takes a rear position as shown in FIG. 2, is suppressed or at least minimized. As is seen from this drawing, when the upper rail 2 takes such rear position relative to the lower rail 1, a longer rear part of the upper rail 2 is drawn from the lower rail 1. In this case, the mutual engagement between the lower and upper rails 1 and 2 is effected at only the front portion of the upper rail 2 leaving a poor mechanical connection therebetween. Thus, usage of the engagement between the stopper structure 17 and the catch portion 23 compensates such poor connection.

Seventh, as is seen from FIG. 4, under the lock condition of the lock mechanism 6, the pawls 7 of the latch lever 8 are received in not only the holding openings 14 of the supporting bracket 12 and the lock openings 9 of the lock plate 10 but also the holding openings 26 of the side wall portion 2b of the upper rail 2. Thus, under this lock condition, each of the pawls 7 of the latch lever 8 is assuredly prevented from being deformed even when a marked stress is applied to the upper rail 2. Provision of the inwardly depressed portion 25 assures the engagement of the holding openings 26 of the side wall portion 2b with the leading ends of the pawls 7 of the latch lever 8.

Figure 8:
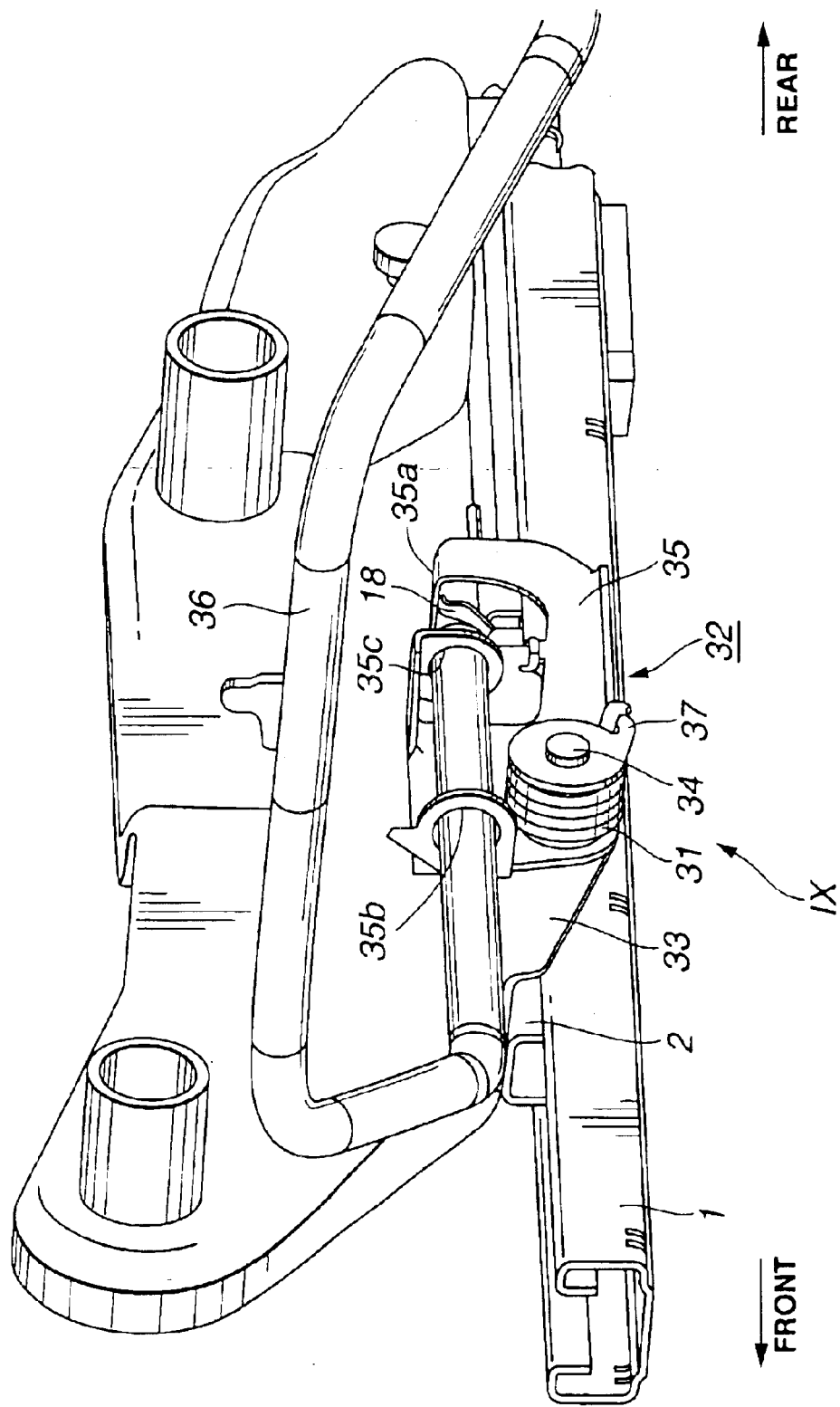
FIG. 8 is an enlarged perspective view of a first modification of a lock canceling mechanism, which can be employed in the first embodiment.
Figure 9:
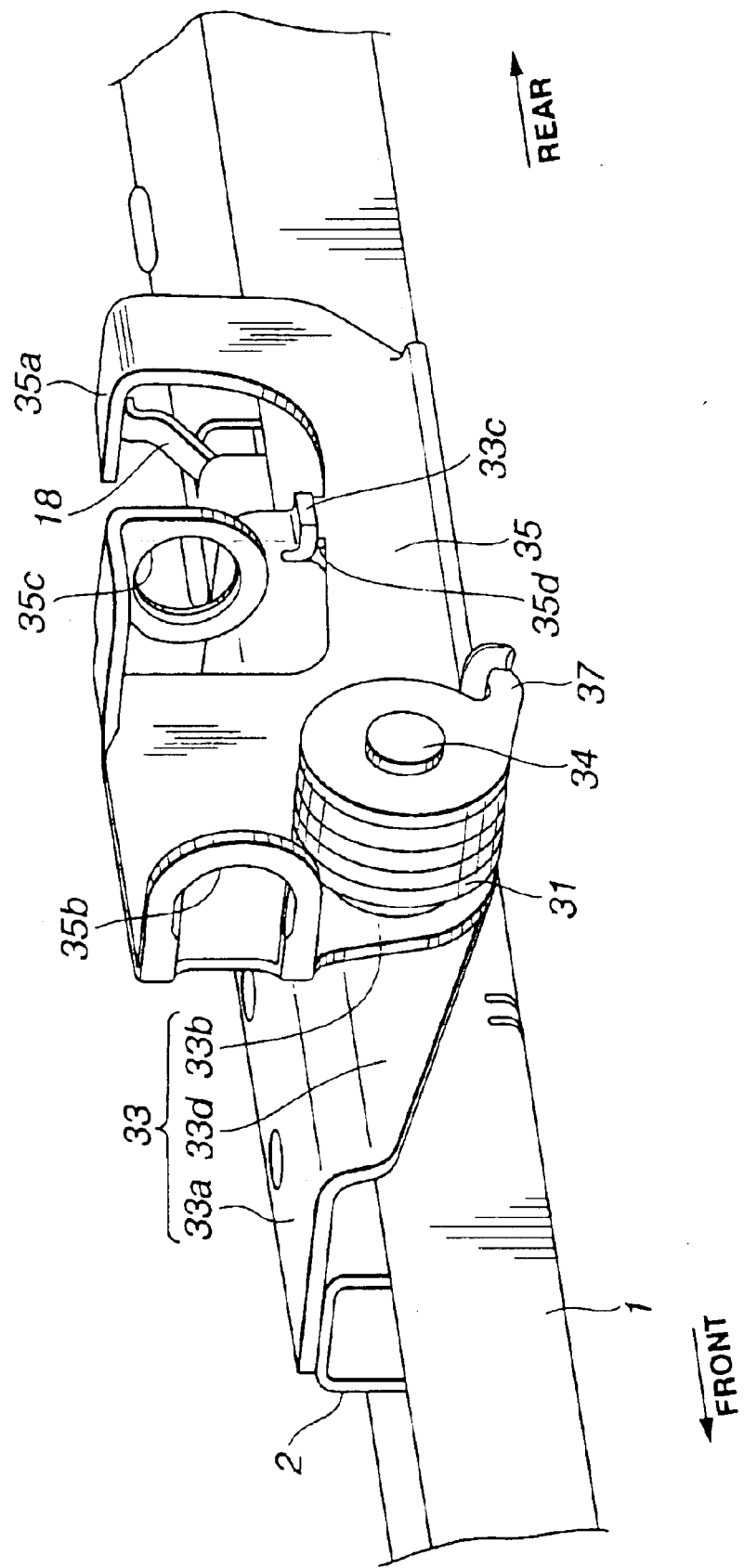
FIG. 9 is an enlarged view of an essential portion of the first modification, which is indicated by the arrow "IX" in FIG. 8.

Referring to FIGS. 8 and 9, there is shown a first modification 30A of the lock canceling mechanism 30 described hereinabove.

The lock canceling mechanism 30A of this first modification is used particularly in a case wherein there is only a small space or clearance below the seat.

As is seen from FIG. 9, the modified lock canceling mechanism 30A comprises a support plate 33 that comprises a horizontal wall portion 33a welded to the upper rail 2 and a vertical wall potion 33b raised upward. It is to be noted that between the horizontal and vertical wall portions 33a and 33b, there is formed or defined a depressed horizontal wall portion 33d. This means that the vertical wall portion 33b that is positioned below the seat (not shown) can be set at a relatively low position relative to the upper rail 2. The vertical wall portion 33b is formed at a rear end thereof with a projection 33c which serves as a stopper as will become apparent as the description proceeds.

A generally U-shaped holder 35 is pivotally connected at its front lower portion to the vertical wall portion 33b of the support plate 33 through a shaft 34 fixed to the vertical wall portion 33b. The holder 35 comprises a pushing arm 35a that has a head positioned above the projected head of the above-mentioned input arm 18 of the latch lever 8, front and rear apertured brackets 35b and 35c that project inward and a projection 35d that is contactable with the projection 33c of the support plate 33.

A return coil spring 31 is disposed about the shaft 34 having one end fixed to the holder 35 and the other end fixed to a spring seat 37 secured to the shaft 34. With this, the holder 35 is biased to pivot about the shaft 34 counterclockwise in FIG. 9, that is, in a direction to separate the head portion of the pushing arm 35a from the projected head of the input arm 18. Due to contact of the projection 35d with the projection 33c, the raised pivoting of the holder 35 due to the force of the spring 31 is restricted, as is seen from the drawing.

As is seen from FIG. 8, a rear end of one side portion of a U-shaped handle 36 is tightly inserted into the apertures of the front and rear brackets 35b and 35c. Thus, when the handle 36 is pulled upward against the biasing force of the spring 31, the holder 35 is pivoted about the shaft 34 in a clockwise direction and thus, the head of the pushing arm 35a of the holder 35 pushes down the input arm 18 of the latch lever 8. Upon this, the lock mechanism 6 is forced to take the unlock position against the force of the bar spring 11, as is seen from FIG. 7. Under this condition, the seat can be moved forward or rearward freely relative to the lower rails 1 (only one is shown). When the handle 36 is released, the holder 35 is pivoted back due to the force of the spring 31. Thus, for the reasons as has been mentioned hereinabove, the lock mechanism 6 is forced to take the lock condition as is seen from FIG. 4.

Figure 10:
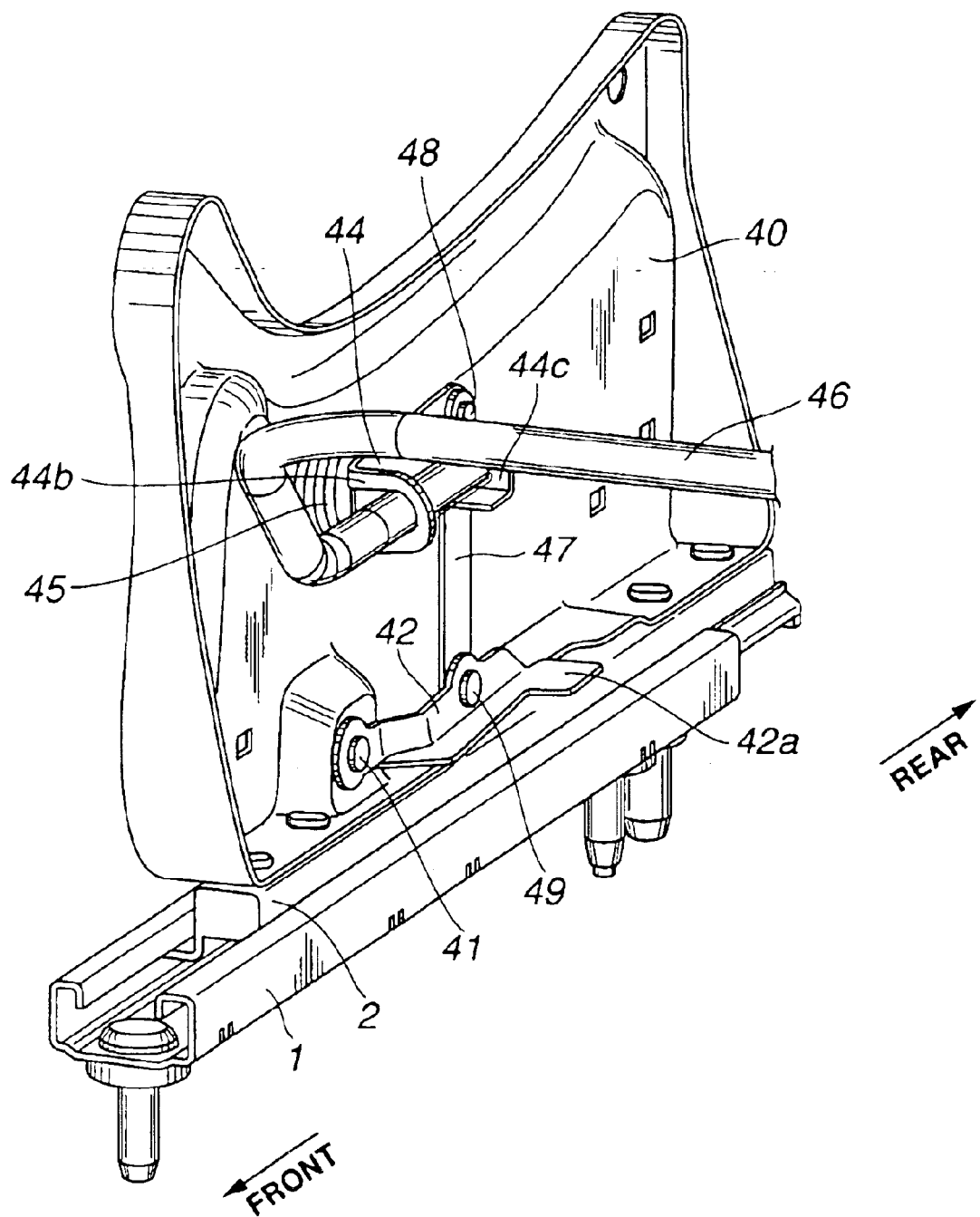
FIG. 10 is an enlarged perspective of a second modification of the lock canceling mechanism, which can be employed in the first embodiment.
Figure 11:
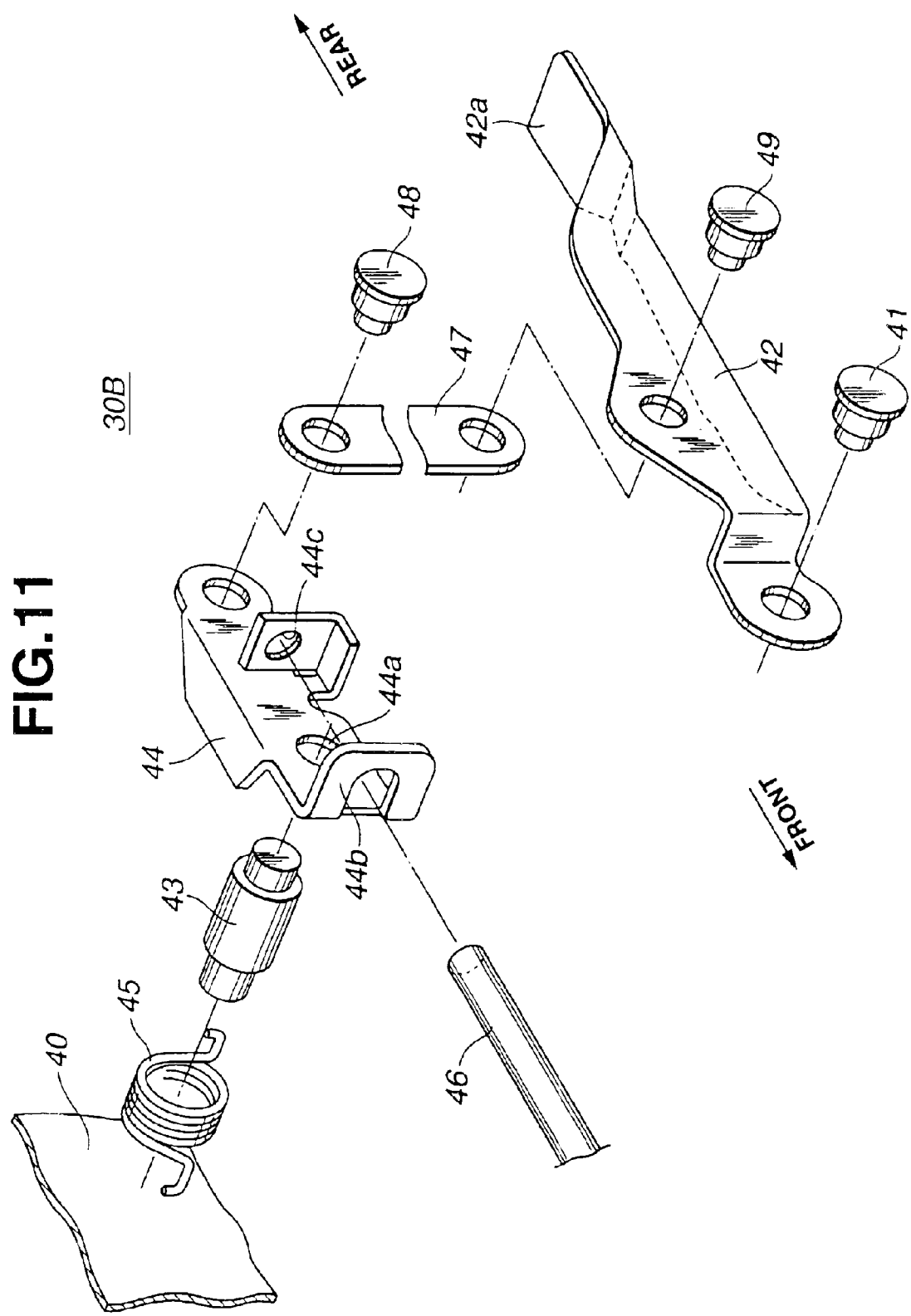
FIG. 11 is an exploded view of the second modification of the lock canceling mechanism of FIG. 10.

Referring to FIGS. 10 and 11, there is shown a second modification 30B of the lock canceling mechanism 30.

The lock canceling mechanism 30B of this second modification is used particularly in a case wherein the seat is positioned relatively high or the right and left slide rail units are mounted on areas of the vehicle floor that have different heights.

As is seen from FIG. 10, the lock canceling mechanism 30B of this modification comprises a side plate 40 that has a lower edge secured to the upper rail 2 and an upper edge (no numeral) supporting the seat (not shown). A pivot lever 42 is pivotally connected at its front end to the side plate 40 through a pin 41 secured to the side plate 40. The pivot lever 42 has at its rear portion a pushing lug 42a that is positioned above the projected head (not shown) of the input arm 18 of the latch lever 8.

As is best seen from FIG. 11, a pivotal holder 44 is positioned above the pivot lever 42, which is pivotally connected to the side plate 40 through a shaft 43 fixed to the side plate 40. For pivotal engagement with the shaft 43, the pivotal holder 44 is formed with an opening 44a into which a smaller diameter end of the shaft 43 inserts. The pivotal holder 44 is formed with front and rear apertured brackets 44b and 44c that project inward.

A connecting lever 47 has an upper end pivotally connected through a pin 48 to a rear end of the pivotal holder 44 and a lower end pivotally connected through a pin 49 to a middle portion of the pivot lever 42.

A return coil spring 45 is disposed about the shaft 43 having one end hooked to the side plate 40 and the other end hooked to the pivotal holder 44. With this, the pivotal holder 44 is biased to pivot about the shaft 43 counterclockwise in FIG. 10 pulling up the pivot lever 42. Thus, under this condition, the pushing lug 42 is separated from the projected head (not shown) of the input arm 18 of the latch lever 8.

As is seen from FIG. 10, a rear end of one side portion of a handle 46 is tightly received in the apertures of the front and rear brackets 44b and 44c of the pivotal holder 44. Thus, when the handle 46 is pulled upward against the biasing force of the spring 45, the pivotal holder 44 is pivoted about the shaft 43 in a clockwise direction in the drawing and thus, the pushing lug 42a of the pivot lever 42 pivotally connected to the pivotal holder 44 through the connecting lever 47 pushes down the input arm 18 (not shown in the drawing) of the latch lever 8. Upon this, the lock mechanism 6 is forced to take the unlock position against the force of the bar spring 11, as is seen from FIG. 7. When now the handle 46 is released, the pivotal holder 44 is pivoted back to the force of the spring 45, and thus, the lock mechanism 6 is forced to take the lock condition as is seen from FIG. 4.

Referring to FIGS. 12 to 15, there is shown a third modification 30C of the lock canceling mechanism 30. In the above-mentioned lock canceling mechanisms 30, 30A and 30B, a so-called loop type handle 28, 36 or 46 is used. While, in the third modification 30C, a turn lever type handle is used.

Figure 12:
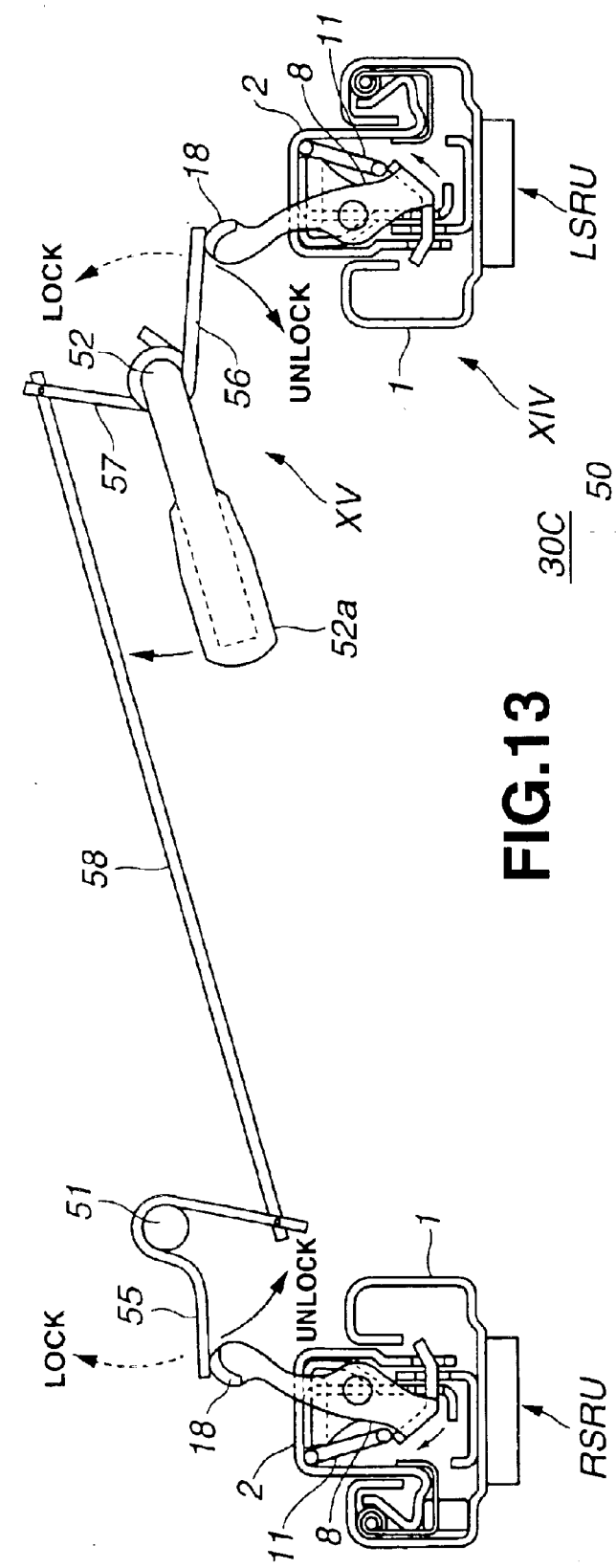
FIG. 12 is a front view of a third modification of the lock canceling mechanism, which can be employed in the first embodiment.

As is seen from FIG. 12 that shows right and left slide rail units RSRU and LSRU, along and beside these slide units, there extend first and second shafts 51 and 52 respectively.

Figure 13:
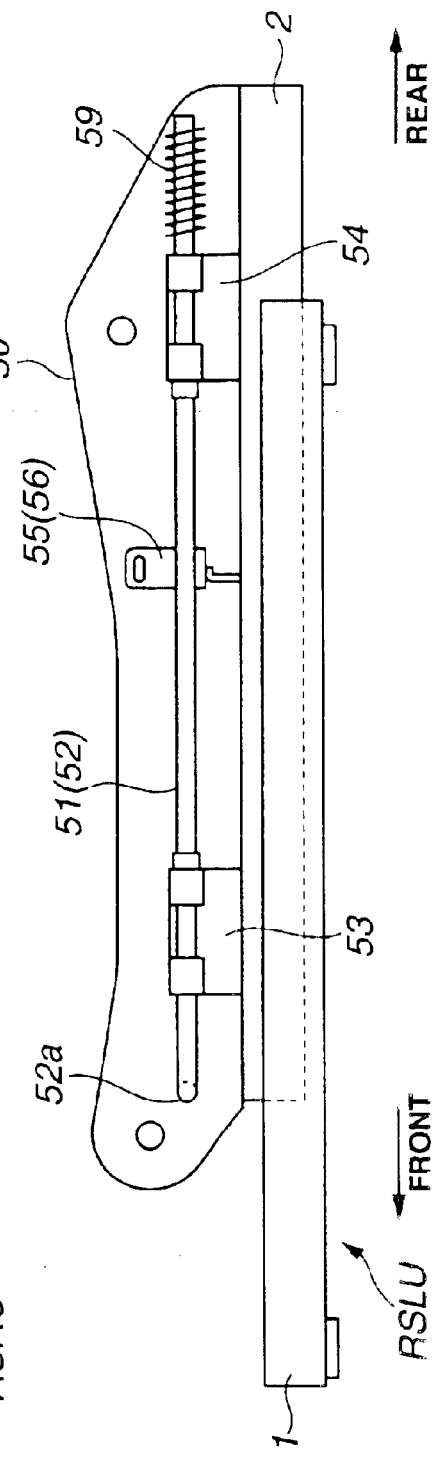
FIG. 13 is a side view of the third modification of the lock canceling mechanism.

As is seen from FIG. 13, each of the first and second shafts 51 and 52 is rotatably held by front and rear holders 53 and 54 that are secured to the upper rail 2. A side plate 50 supporting a seat (not shown) is secured to the upper rail 2, and thus the seat can move relative to the lower rail 1. The second shaft 52 has a front portion 52a that is bent at generally right angle to constitute a turn lever 52a.

Referring back to FIG. 12, first and second pushing levers 55 and 56 are secured to middle portions of the first and second shafts 51 and 52 respectively. Each of the first and second pushing levers 55 and 56 has an outside arm that is contactable with the head of the input arm 18 of the latch lever 8. The first pushing lever 55 has an inside arm to which one end of a connecting rod 58 is pivotally connected. The other end of the connecting rod 58 is pivotally connected to an auxiliary lever 57 that is secured to the second shaft 52.

Figure 15:
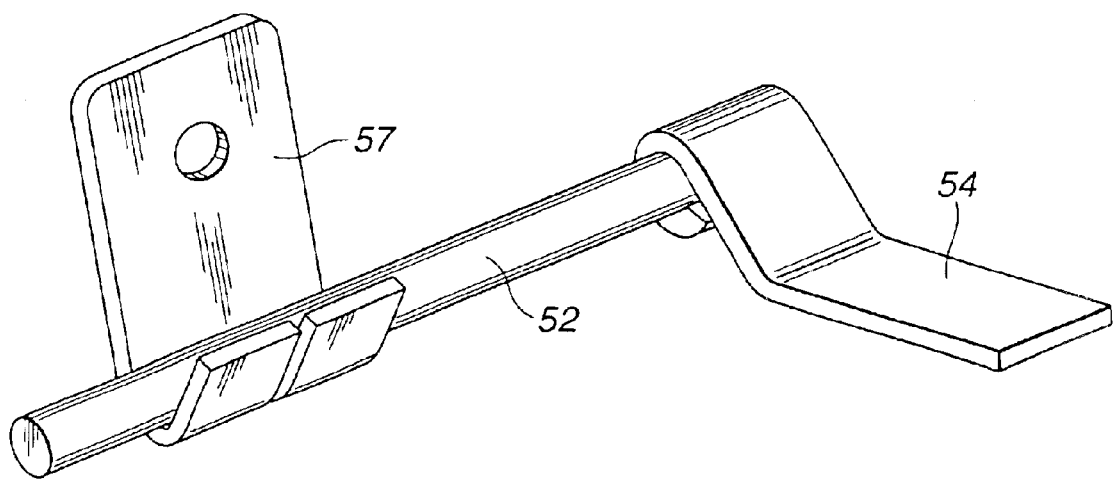
FIG. 15 is an enlarged view of another portion of the third modification of the lock canceling mechanism, which is indicated by the arrow "XV" in FIG. 12.

A unit consisting of the second shaft 52, the auxiliary lever 57 secured to the second shaft 52 and the rear holder 54 rotatably holding the second shaft 52 is shown in FIG. 15.

As is seen from FIG. 13, a coil spring 59 is disposed about a rear end of the first shaft 51 to bias the shaft 51 to turn clockwise in FIG. 12, and another coil spring (59) is disposed about a rear end of the second shaft 52 to turn counterclockwise in FIG. 12.

Thus, as is understood from FIG. 12, when the turn lever 52a is released, the first and second pushing levers 55 and 56 are kept separated from the associated input arms 18 of the latch levers 8 due to the biasing force of the coil springs 59. Under this condition, the lock mechanism 6 of each slide rail unit RSRU or LSRU assumes the lock condition for the reasons as has been mentioned hereinabove.

When now, the turn lever 52a is pulled up or turned clockwise in FIG. 12 against the force of the coil springs 59, the first and second pushing levers 55 and 56 are forced to turn counterclockwise and clockwise respectively due to the pivotal connection between therebetween through the connecting rod 58. Thus, as is seen from the drawing, the first and second pushing levers 55 and 56 push down the associated input arms 18 of the latch levers 8 of the right and left slide rail units RSRU and LSRU. Upon this, for the reasons as mentioned hereinabove, the respective lock mechanisms 6 are forced to assume the unlock condition, and thus, the seat can move forward or rearward freely relative to the lower rails 1. When the turn lever 52a is released, the lock mechanisms 6 are returned to take the lock condition.

Referring to FIGS. 19 to 25, particularly FIGS. 19 to 22, there is shown a seat slide device 100B which is a second embodiment of the present invention.

Since the seat slide device 100B is similar in construction to the above-mentioned seat slide device 100A of the first embodiment, the following description on the device 100B will be directed to only portions which are different from those of the first embodiment 100A.

Figure 19:
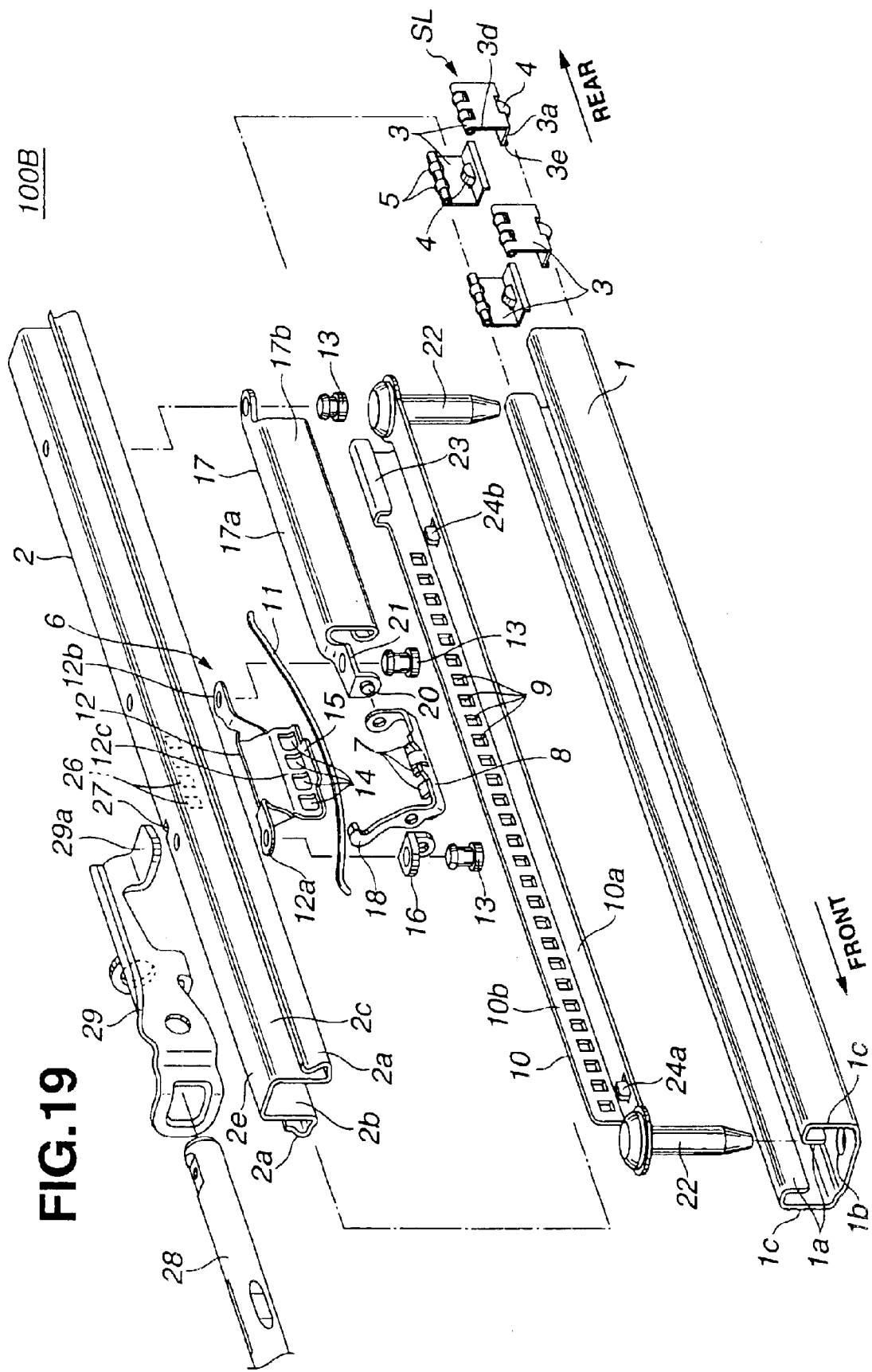
FIG. 19 is a view similar to FIG. 1, but showing a seat slide device which is a second embodiment of the present invention.
Figure 20:
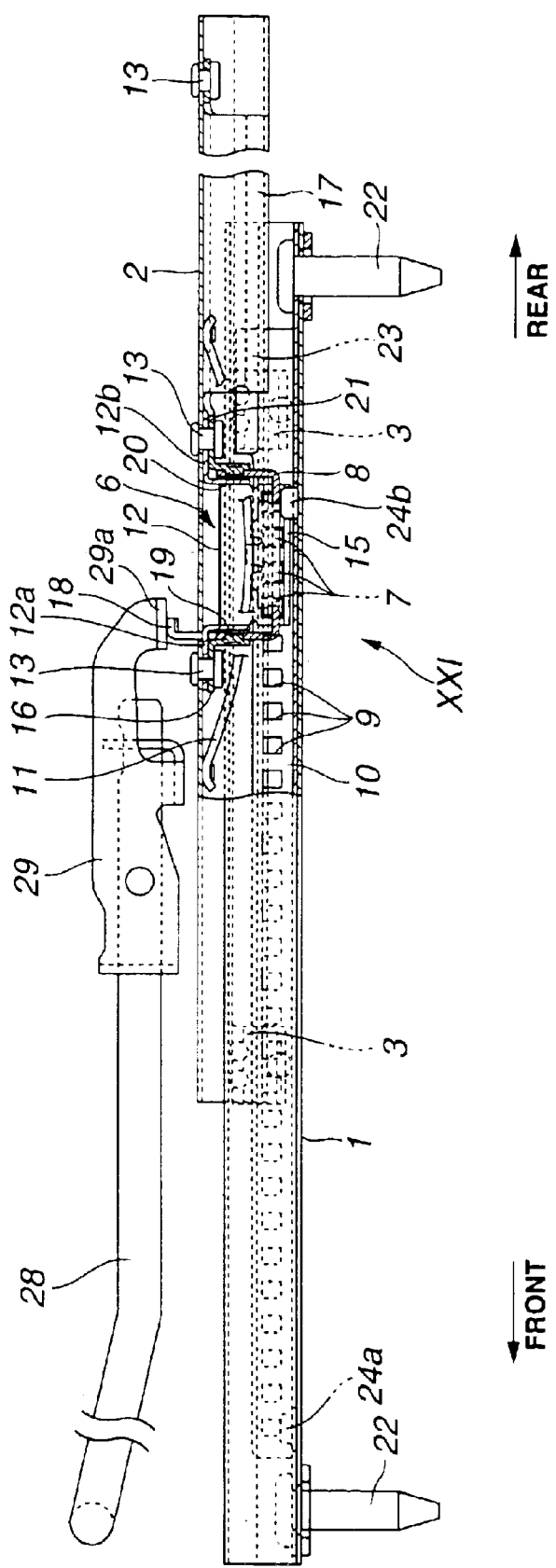
FIG. 20 is a view similar to FIG. 2, but showing the second embodiment.

As is well shown in FIG. 19, in the second embodiment 100B, the lock plate 10 is secured to the lower rail 1 by the bolts 22. For this securing, the elongate lower base portion 10a of the lock plate 10 has at its longitudinal ends respective bolt openings (no numerals) through which the bolts 22 pass. Each bolt 22 passes through an opening 1b formed in the lower rail 1 for tight engagement with a threaded bolt opening (not shown) formed in the vehicle floor (not shown).

Figure 21:
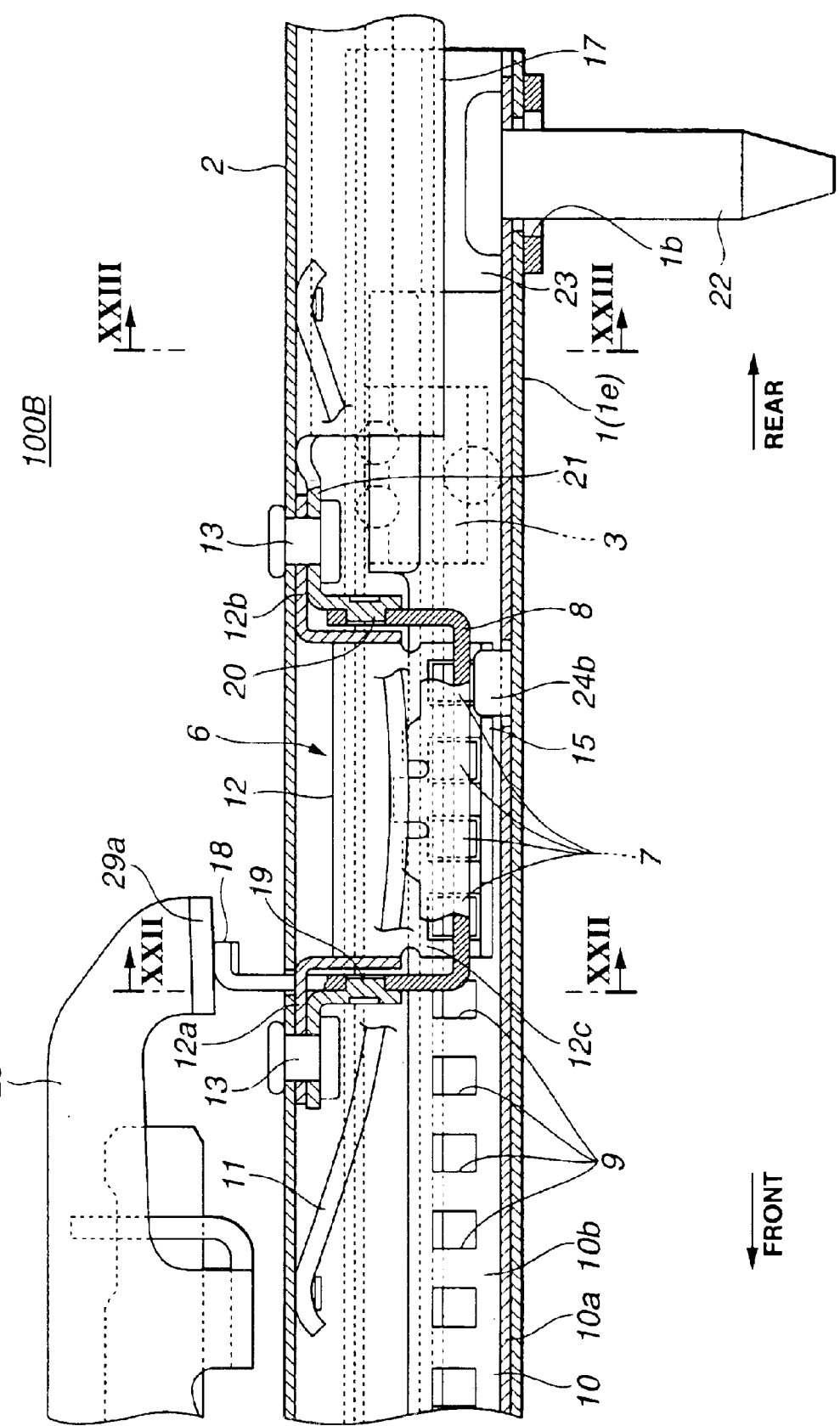
FIG. 21 is a view similar to FIG. 3, but showing the second embodiment.

Thus, as is seen from FIG. 21, the apertured end of the elongate lower base portion 10a is directly put on the apertured end of the lower rail 1. Due to this direct engagement, secured connection of the lock plate 10 to the lower rail 1 is achieved.

Figure 22:
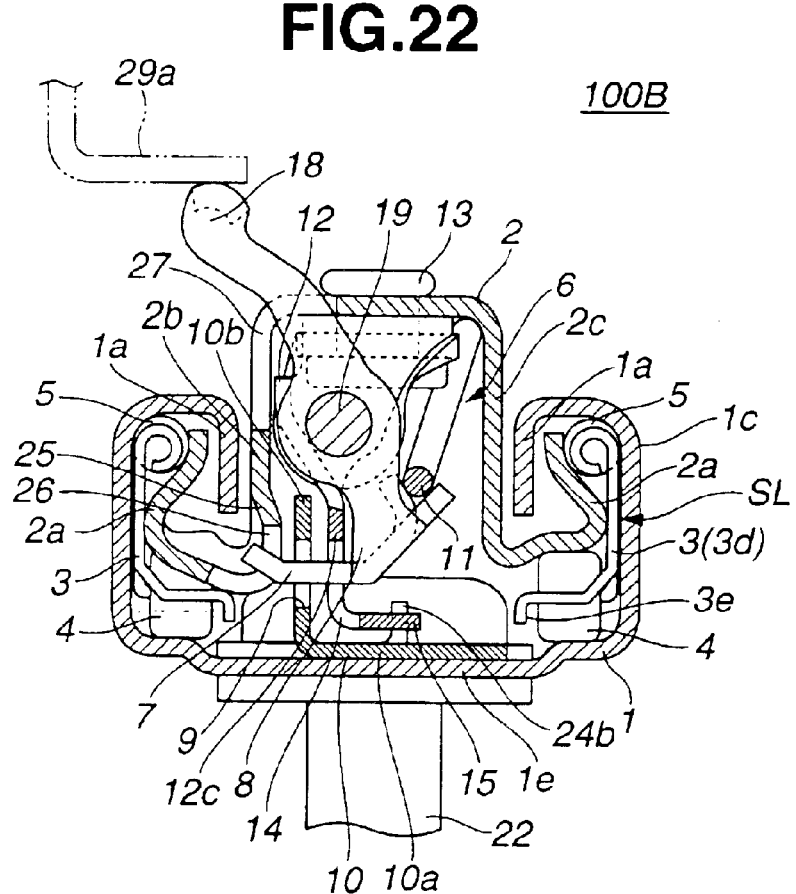
FIG. 22 is a view similar to FIG. 4, but showing the second embodiment.
Figure 23:
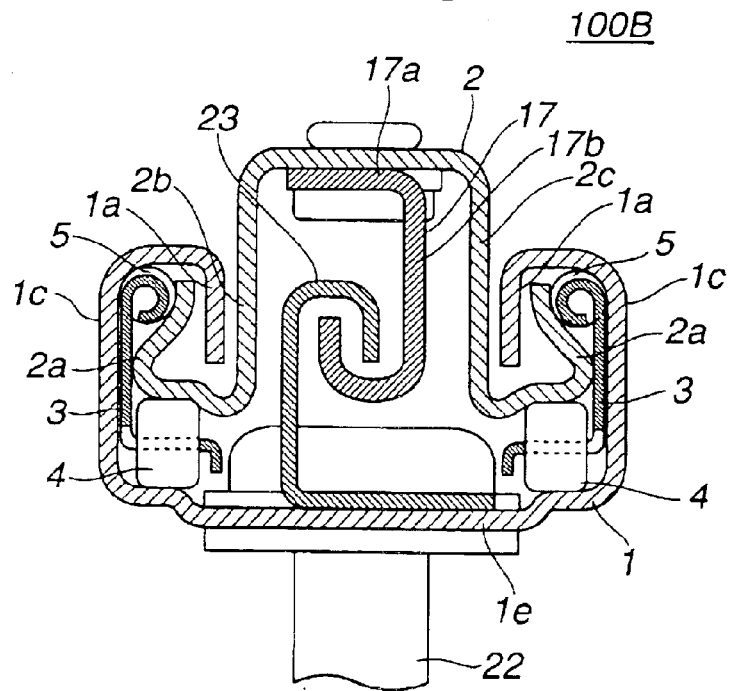
FIG. 23 is a view similar to FIG. 5, but showing the second embodiment.
Figure 24:
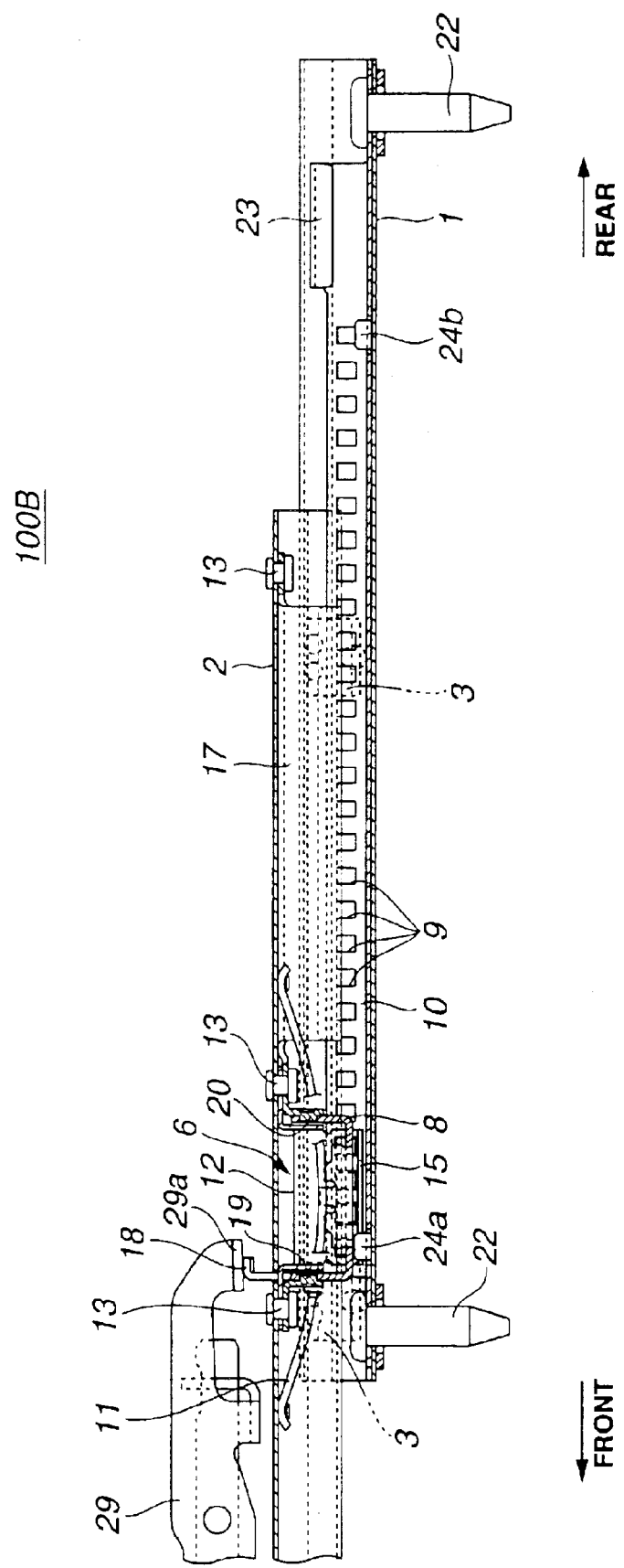
FIG. 24 is a view similar to FIG. 6, but showing the second embodiment.
Figure 25:
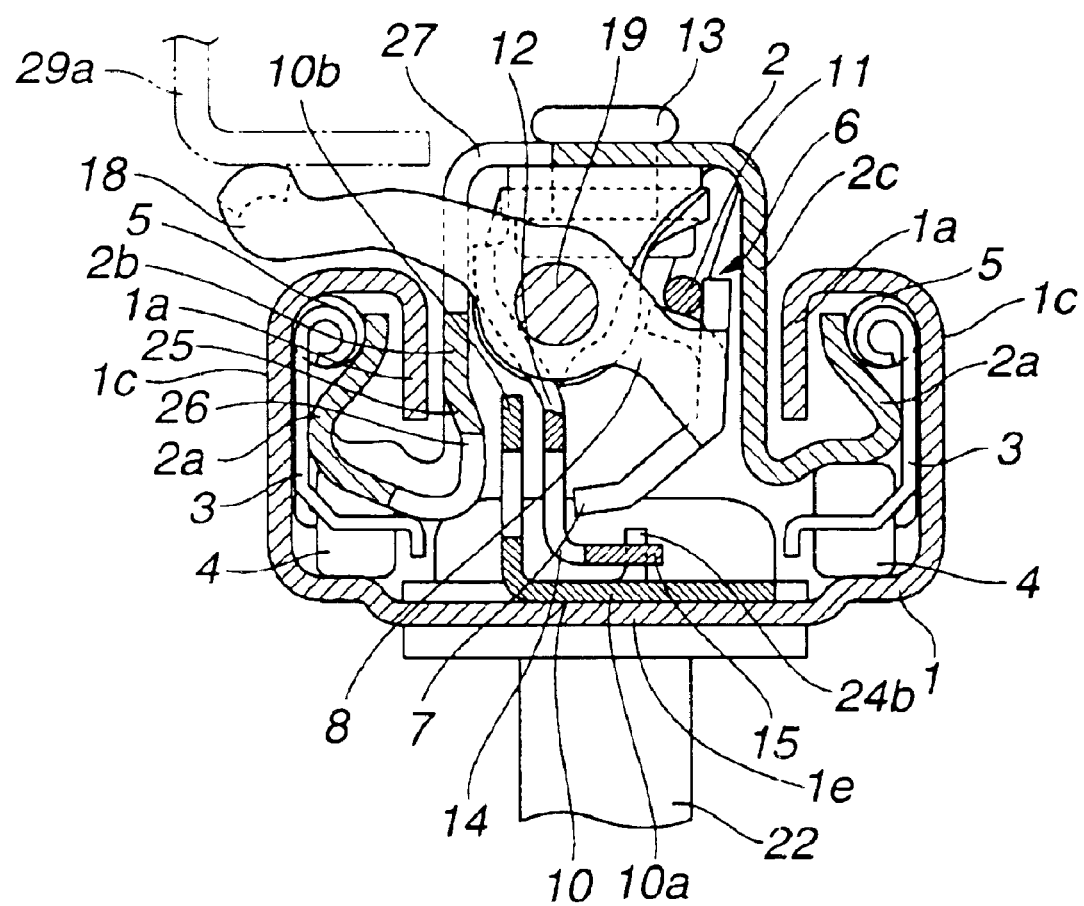
FIG. 25 is a view similar to FIG. 7, but showing the second embodiment.

As is seen from FIGS. 19 and 22, the retainer plates 3 of the sliders SL have a different shape from those of the first embodiment 100A (see FIG. 1). That is, each retainer plate 3 employed in the second embodiment 100B comprises a base lower wall 3a by which the roller 4 is rotatably held, a higher vertical side wall 3d by which the guide balls 5 are rotatably held and a lower ridge 3e bent downward from the base lower wall 3a.

Because of the similar structure to the first embodiment 100A, the second embodiment 100B has substantially the same advantages as those of the first embodiment 100A described hereinabove. Besides, in the second embodiment 100B, due to usage of the bolts 22 for connecting the lock plate 10 to the lower rail 1, there is no need of employing the welding for such connection.

Referring to FIGS. 26 to 32, particularly FIGS. 26 to 29, there is shown a seat slide device 100C which is a third embodiment of the present invention.

Since the seat slide device 100C is similar in construction to the above-mentioned seat slide device 100B of the second embodiment, only portions which are different from those of the first embodiment 100B will be described in detail in the following.

Figure 26:
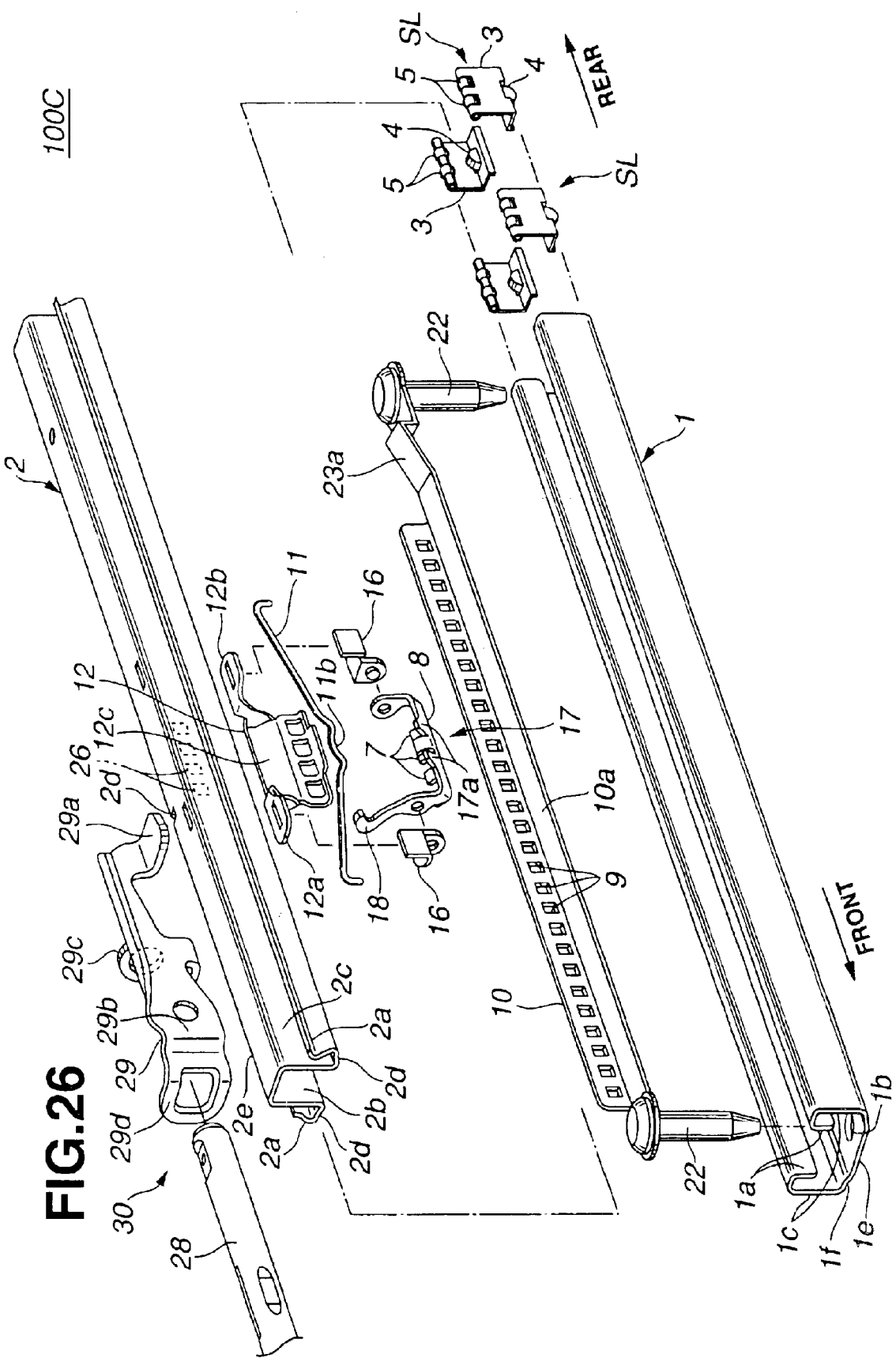
FIG. 26 is a view similar to FIG. 1, but showing a seat slide device which is a third embodiment of the present invention.
Figure 27:
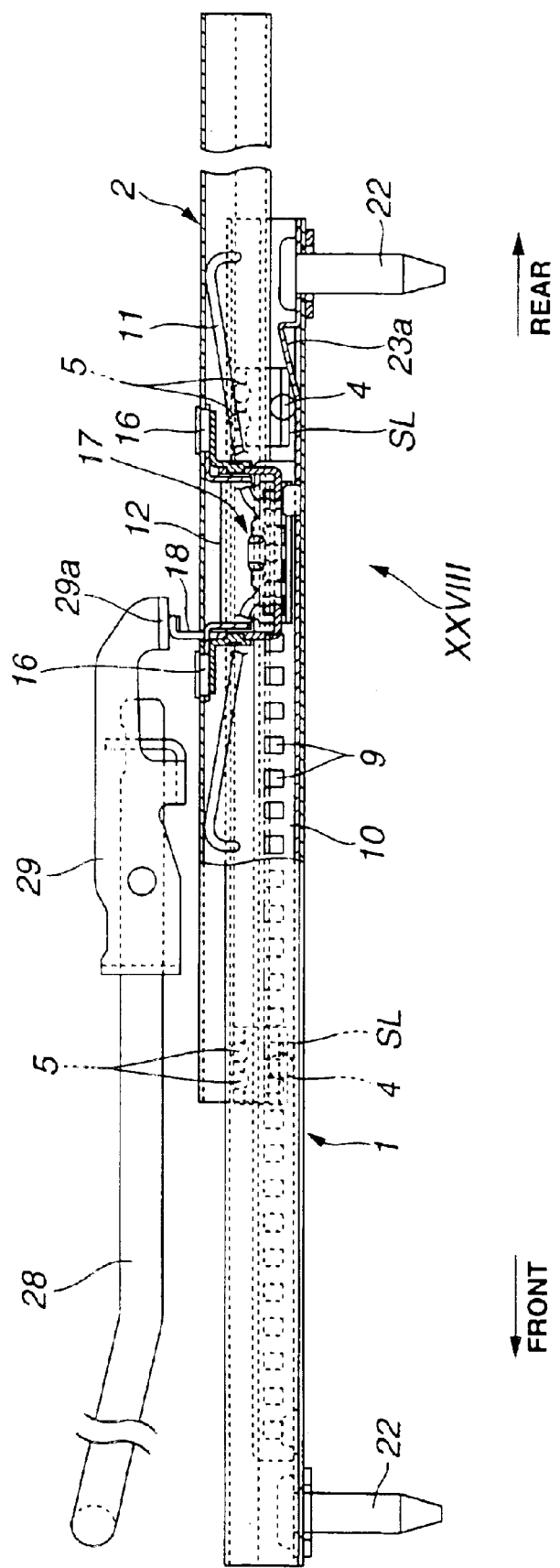
FIG. 27 is a view similar to FIG. 2, but showing the third embodiment.

As is seen from FIG. 26, in the third embodiment 100C, the bar spring 11 has at its middle portion two aligned projections 11a between which a depressed portion 11b is defined. For engagement with such projections 11a, the toothed portion 7 of the bridge portion of the latch lever 8 has a spring catch portion 17.

Figure 28:
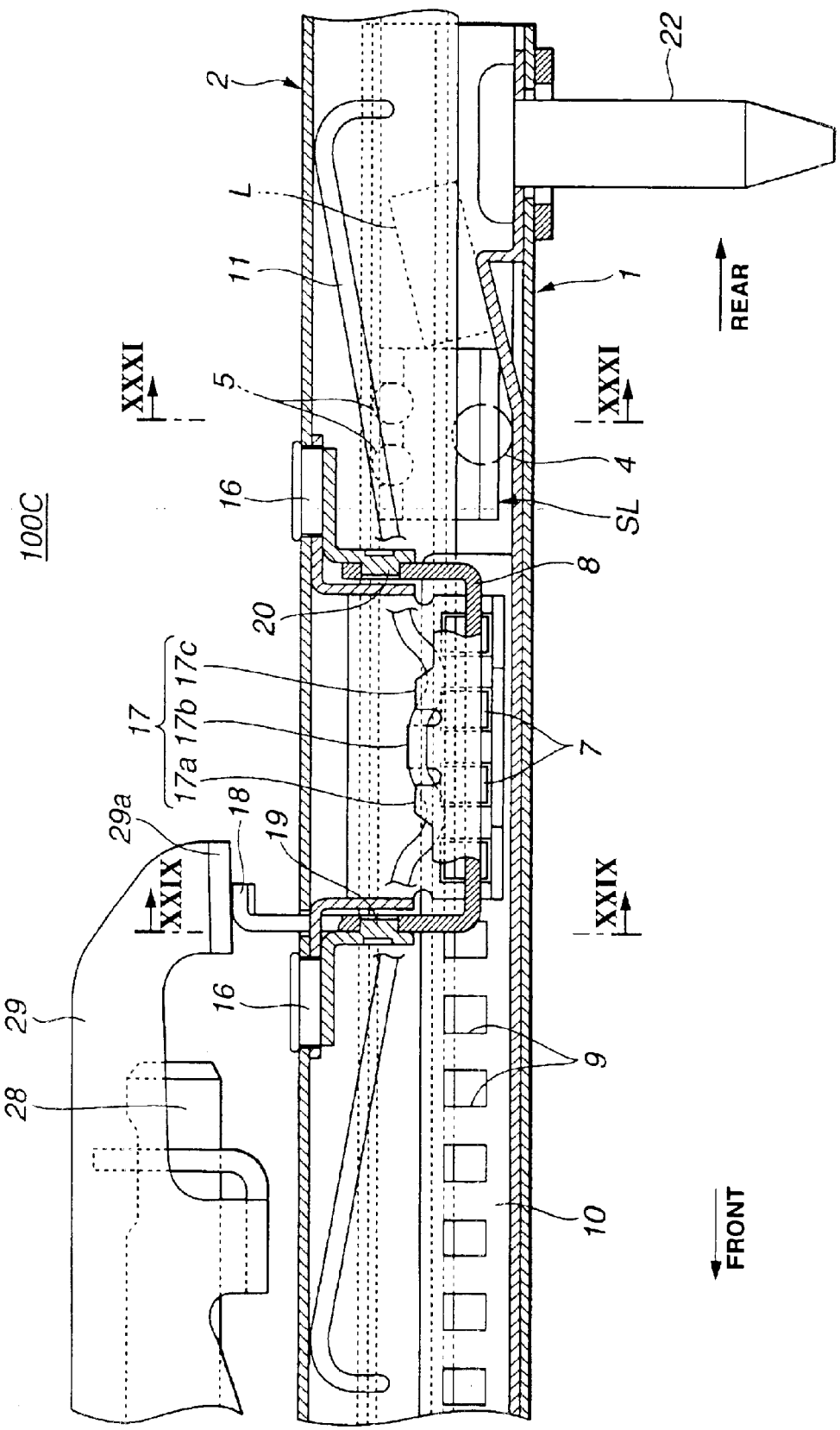
FIG. 28 is a view similar to FIG. 3, but showing the third embodiment.
Figure 29:
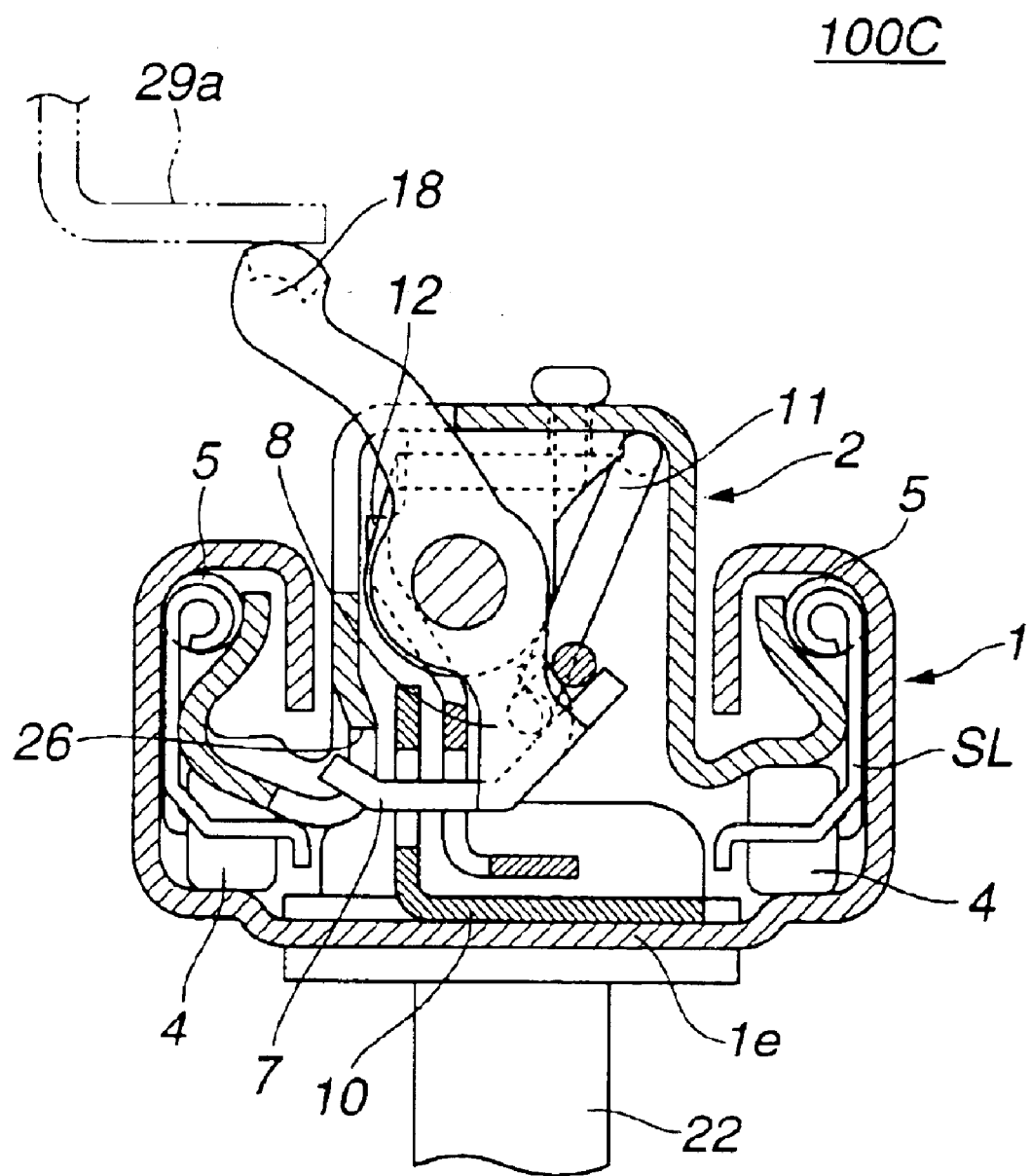
FIG. 29 is a view similar to FIG. 4, but showing the third embodiment.
Figure 30:
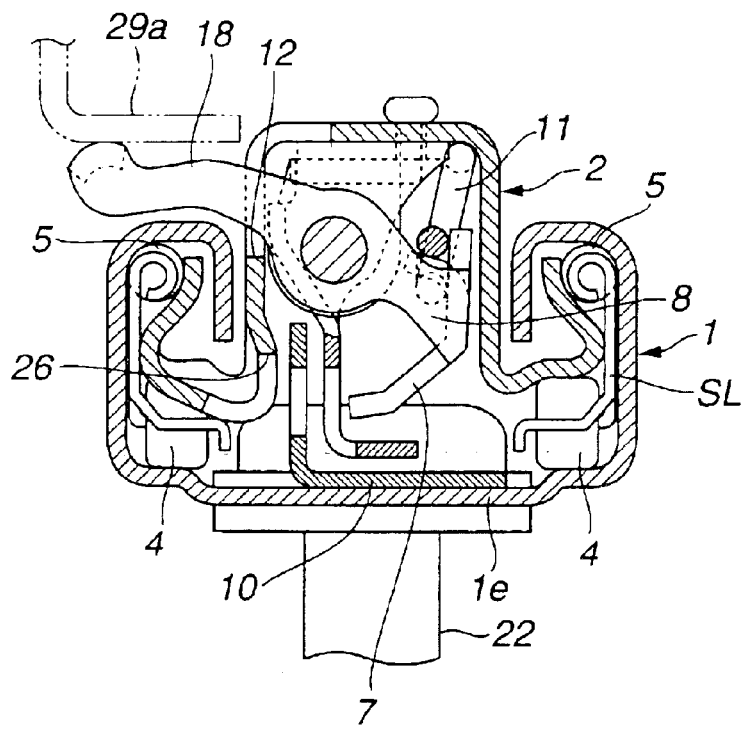
FIG. 30 is a view similar to FIG. 7, but showing the third embodiment.
Figure 31:
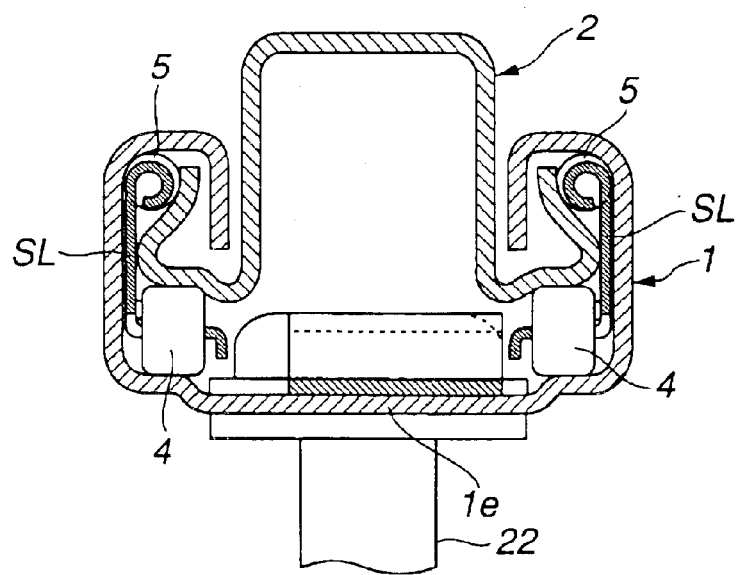
FIG. 31 is a view similar to FIG. 5, but showing the third embodiment.

As is best seen from FIG. 28, the spring catch portion 17 comprises two aligned projections 17a between which an offset projection 17b is defined. Upon assembly, these three projections 17a and 17b of the spring catch portion 17 of the latch lever 8 neatly receive the three portions 11a and 11b of the middle portion of the bar spring 11 in a one-to-one engaging manner. Due to this engagement, an axial displacement of the bar spring 11 relative to the spring catch portion 17 of the latch lever 8 is suppressed.

As is seen from FIG. 26, the elongate lower base portion 10a of the lock plate 10 has at its rear end portion an inclined surface 23a. As shown, the inclined surface has a top that is higher than the head of the nearby bolt 22.

Due to provision of the inclined surface 23a, a small article, such as, lighter, cigarette or the like, that is accidentally slid into a rear position of the inner space of the slide rail unit can be readily taken out. That is, as is seen from FIG. 28, in such a case, the seat is slid rearward in the above-mentioned manner. Due to this rearward movement, the sliders SL are moved rearward together with the upper rail 2 pushing the article L rearward. When the seat comes to the rearmost position, the article L is pushed up onto the inclined surface 23a and then pushed out of the rail unit.

The entire contents of Japanese Patent Applications 2002-369252 filed Dec. 20, 2002; 2003-348925 filed Oct. 8, 2003; 2003-172736 filed Jun. 18, 2003; 2003-340293 filed Sep. 30, 2003; and 2003-340292 filed Sep. 30, 2003.

Although the invention has been described above with reference to the embodiment of the invention, the invention is not limited to such embodiment as described above. Various modifications and variations of such embodiment may be carried out by those skilled in the art, in light of the above description.

What is claimed is:

1. A seat slide device comprising:
   a lower rail having a channel structure;
   an upper rail having a channel structure, the upper rail being slidably engaged with the lower rail in a manner to define therebetween an elongate enclosed space;
   an elongate lock plate placed in the elongate enclosed space and secured to the lower rail;
   a latch lever including a pawl portion and an input arm and placed in the elongate enclosed space, the latch lever being pivotally connected to the upper rail to pivot about a given axis that extends in parallel with the upper rail, the latch lever being pivotal between a lock position where the pawl portion is engaged with a part of the lock plate to establish a locked engagement between the lower and upper rails and an unlock position where the pawl portion is released from the lock plate to cancel the locked engagement, the latch lever being pivoted in a direction from the lock position to the unlock position when the input arm is applied with an external force;
   a spring member placed in the elongate enclosed space for biasing the latch lever to pivot toward the lock position; and
   an opening formed in the upper rail for having a given part of the input arm projected outward therethrough.

2. The seat slide device as claimed in claim 1, in which the lock plate has a generally L-shaped cross section including a lower base portion secured to the lower rail and a vertical wall portion formed with a plurality of aligned lock openings and in which the pawl portion of the latch lever includes a plurality of pawls which are engaged with some of the aligned lock openings of the lock plate when the latch lever is in the lock position.

3. The seat slide device as claimed in claim 2, further comprising a supporting bracket placed in the elongate enclosed space and secured to the upper rail, the supporting bracket being formed with holding openings through which the pawls of the latch lever are engaged while engaging the lock openings of the lock plate for establishing the lock position of the latch lever.

4. The seat slide device as claimed in claim 3, in which the upper rail is formed with holding openings with which leading ends of the pawls of the latch lever are engaged when the latch lever assumes the lock position.

5. The seat slide device as claimed in claim 4, in which the vertical wall portion of the lock plate is positioned between a portion of the supporting bracket where the holding openings are formed and a portion of the upper rail where the holding openings are formed, and in which the pawls of the latch lever pass through the holding openings of the supporting bracket, the lock openings of the lock plate and the holding portions of the upper rail when the latch lever is in the lock position.

6. The seat slide device as claimed in claim 3, further comprising:
   a front stopper provided by a front portion of the lock plate;
   a rear stopper provided by a rear portion of the lock plate; and
   an edge portion provided by the supporting bracket, the edge portion being brought into abutment with the front and rear stoppers when the upper rail is brought to the frontmost and rearmost positions respectively relative to the lower rail.

7. The seat slide device as claimed in claim 1, in which the latch lever comprises:
   a bridge portion on which the pawls are integrally formed; and
   two side arms extending in the same direction from opposed ends of the bridge portion, one of the side arms constituting the input arm.

8. The seat slide device as claimed in claim 7, in which the two side arms of the latch lever are pivotally held by first and second pin portions which are aligned and provided by respective bracket members secured to the upper rail.

9. The seat slide device as claimed in claim 8, further comprising:
   a stopper structure positioned in the elongate enclosed space and secured to the upper rail, the stopper structure having the first pin portion and a first channel portion; and
   a catch portion formed on one end of the lock plate, the catch portion having a second channel portion, the second channel portion being slidably engaged with the first channel portion in such a manner as to suppress a vertical separation therebetween.

10. The seat slide device as claimed in claim 7, in which the spring member is a curved bar spring, the curved bar spring having opposed ends pressed against an inside wall of the upper rail and a swelled center portion engaged with the bridge portion of the latch lever.

11. The seat slide device as claimed in claim 10, in which the center portion of the curved bar spring is formed with projections which are meshed with projections formed on the bridge portion of the latch lever.

12. The seat slide device as claimed in claim 1, further comprising:

a front pair of sliders slidably installed in a front portion of the elongate enclosed space for smoothing movement of the upper rail relative to the lower rail;

a rear pair of sliders slidably installed in a rear portion of the elongate enclosed space for smoothing movement of the upper rail relative to the lower rail, wherein the latch lever is positioned between the front and rear pairs of sliders.

13. The seat slide device as claimed in claim 12, in which each of the sliders comprises:

a retainer of a generally L-shaped cross section including a base lower wall and a vertical side wall;

a roller rotatably held by the base lower wall; and guide balls rotatably held by the vertical side wall, wherein the roller and the guide balls each contact both the lower and upper rails.

14. The seat slide device as claimed in claim 13, in which each of the sliders further comprises:

another vertical side wall possessed by the retainer; and a projection possessed by the another vertical side wall and slidably contacting the upper wall.

15. The seat slide device as claimed in claim 1, in which the lock plate is secured to the lower rail by welding.

16. The seat slide device as claimed in claim 1, in which the lock plate is secured to a vehicle floor through the lower rail by bolts.

17. The seat slide device as claimed in claim 16, in which the lock plate is formed at its longitudinal ends with bolt openings through which the bolts pass.

18. The seat slide device as claimed in claim 16, in which the lock plate is formed at a portion near one of the bolts with an inclined surface, the top of the inclined surface being higher than the head of one of the bolts.

19. The seat slide device as claimed in claim 1, further comprising a lock canceling mechanism which pushes the given part of the input arm when actuated.

20. The seat slide device as claimed in claim 19, in which the lock canceling mechanism comprises:

a pivot member pivotally connected to the upper rail, the pivot member having a pushing lug that is positioned above the given part of the input arm that is projected through the opening of the upper rail;

a handle connected to the pivot member to pivot therewith; and a biasing spring associated with the handle to bias the pivot member in a direction to separate the pushing lug from the projected given part of the input arm.

21. The seat slide device as claimed in claim 20, in which the lock canceling mechanism further comprises:

a stand secured to the upper rail, the stand having the pivot member pivotally connected thereto;

aligned openings possessed by the pivot member for receiving therein one end of the handle.

22. The seat slide device as claimed in claim 19, in which the lock canceling mechanism comprises:

a support plate including a horizontal wall portion secured to the upper wall and a vertical wall portion raised upward from a side edge of the horizontal wall portion;

a pivotal holder pivotally connected to the vertical wall portion through a shaft fixed to the vertical wall portion, the pivotal holder having a pushing arm that is positioned above the given part of the input arm that is projected through the opening of the upper rail;

a handle connected to the pivotal holder to pivot therewith; and a return coil spring disposed about the shaft to bias the pivotal holder in a direction to separate the pushing arm from the projected given part of the input arm.

23. The seat slide device as claimed in claim 19, in which the lock canceling mechanism comprises:

a side plate having a lower edge secured to the upper rail;

a pivot lever pivotally connected to the side plate, the pivot lever having a pushing lug that is positioned above the given part of the input arm that is projected from the opening of the upper rail;

a pivotal holder positioned above the pivot lever and pivotally connected to the side plate through a shaft fixed to the side plate;

a connecting lever having a lower end pivotally connected to the pivot lever and an upper end pivotally connected to the pivotal holder;

a handle connected to the pivotal holder to pivot therewith; and a return coil spring disposed about the shaft to bias the pivotal holder and thus the pivot lever in a direction to separate the pushing lug of the pivot lever from the projected given part of the input arm.

24. The seat slide device as claimed in claim 19, in which the lock canceling mechanism comprises:

a shaft extending along the upper rail and rotatably held by front and rear holders that are secured to the upper rail;

a handle provided by bending a front part of the shaft;

a wing structure secured to the shaft to pivot therewith, the wing structure having a pushing lever that is positioned above the given part of the input arm that is projected from the opening of the upper rail; and a coil spring disposed about the shaft to bias the shaft and thus the wing structure in a direction to separate the pushing lever from the projected given part of the input arm.

25. The seat slide device as claimed in claim 24, further comprising a connecting rod through which the pivotal movement of the shaft is transmitted to another shaft that is a part of a lock canceling mechanism employed in a partner seat slide device.

26. A seat slide device comprising:

a lower rail having a generally U-shaped cross section;

an upper rail having a generally reversed U-shaped cross section, the upper rail being slidably engaged with the lower rail in a manner to define therebetween an elongate enclosed space;

an elongate lock plate placed in the elongate enclosed space and secured to the lower rail, the lock plate being formed with a plurality of aligned lock openings;

a latch lever including pawls and an input arm and placed in the elongate enclosed space, the latch lever being pivotally connected to the upper rail to pivot between a lock position where the pawls are inserted into some of the lock openings to establish a locked engagement between the lower and upper rails and an unlock position where the pawls are released from the lock openings to cancel the locked engagement, the latch lever being pivoted in a direction from the lock position to the unlock position when the input arm is pressed in a given direction;

a supporting bracket placed in the elongate enclosed space and secured to the upper rail, the supporting bracket being formed with holding openings through which the pawls of the latch lever are engaged while engaging the lock openings of the lock plate for establishing the lock position of the latch lever;

holding openings formed in the upper rail with which leading ends of the pawls of the latch lever are engaged when the latch lever assumes the lock position;

a curved bar spring having opposed ends pressed against an inside wall of the upper rail and a swelled center portion pressed against the latch lever thereby to bias the latch lever to pivot toward the lock position;

an opening formed in the upper rail from which a given part of the input arm is projected outward; and a lock canceling device mounted on the upper rail, the device pressing the given part of the input arm in the given direction when actuated.

* * * * *